United States Patent
Dittmer

(10) Patent No.: US 12,463,817 B1
(45) Date of Patent: Nov. 4, 2025

(54) EFFICIENT PUBLICLY-VERIFIABLE ZERO-KNOWLEDGE PROOF SYSTEM WITH REDUCED PROOF SIZE

(71) Applicant: Stealth Software Technologies, Inc., Los Angeles, CA (US)

(72) Inventor: Samuel Dittmer, Los Angeles, CA (US)

(73) Assignee: STEALTH SOFTWARE TECHNOLOGIES, INC., Los Angeles, CA (US)

( * ) Notice: Subject to any disclaimer, the term of this patent is extended or adjusted under 35 U.S.C. 154(b) by 67 days.

(21) Appl. No.: 18/663,050

(22) Filed: May 13, 2024

Related U.S. Application Data

(60) Provisional application No. 63/502,072, filed on May 12, 2023.

(51) Int. Cl.
  *H04L 9/32* (2006.01)
  *H04L 9/00* (2022.01)

(52) U.S. Cl.
  CPC ............ *H04L 9/3221* (2013.01); *H04L 9/008* (2013.01); *H04L 9/3236* (2013.01)

(58) Field of Classification Search
  CPC ...... H04L 9/008; H04L 9/3236; H04L 9/3221
  See application file for complete search history.

(56) References Cited

U.S. PATENT DOCUMENTS

| | | | |
|---|---|---|---|
| 11,438,138 B2 * | 9/2022 | Oh ..................... | H04L 9/0618 |
| 12,063,304 B1 * | 8/2024 | Dittmer ................ | H04L 9/3093 |
| 2021/0028939 A1 * | 1/2021 | Trevethan ............ | G06Q 20/401 |
| 2021/0297235 A1 * | 9/2021 | Oh ........................ | H04L 9/3218 |
| 2024/0007292 A1 * | 1/2024 | Moon ................... | H04L 9/3221 |
| 2024/0171401 A1 * | 5/2024 | Kim ...................... | H04L 9/3218 |

OTHER PUBLICATIONS

Dittmer et al., Line-Point Zero Knowledge and Its Applications (Nov. 19, 2020) (Year: 2020).*

* cited by examiner

*Primary Examiner* — Sharon S Lynch
(74) *Attorney, Agent, or Firm* — CipherLaw

(57) ABSTRACT

A method for generating a proof of a statement related to private data without revealing the data to verifier parties. The method involves secure storage of private data and a statement at a prover party's computing device. The statement's validity is encoded as an arithmetic circuit's satisfiability. The method includes computing two vectors, A and B, with A containing random elements and B derived from the private data and the statement. A commitment to these vectors is generated, followed by a hash function to produce a value alpha. These elements are used in a line-point zero knowledge proof system to produce an output vector and a proof of knowledge, ensuring the statement's validity. The proof is stored and made accessible to verifier parties, maintaining the security of the private data.

15 Claims, 3 Drawing Sheets

Protocol $\Pi_{\text{LP-COM-AHE}}$: Line-point commitment protocol from AHE.

Parametrized by a finite field $\mathbb{F}$, an extension field $\mathbb{E}$, a length $n$, and an additive homomorphic encryption scheme AHE.

- $\mathcal{P}$ chooses inputs $\mathbf{a} \in \mathbb{F}^n$ and $\mathbf{b} \in \mathbb{E}^n$, with $\mathbf{b}$ chosen uniformly at random.
- $\mathcal{P}$ pads each of $\mathbf{a}$, $\mathbf{b}$ with one random value, then homomorphically encrypts the vectors $\mathbf{e_a} := E(\mathbf{a})$ and $\mathbf{e_b} := E(\mathbf{b})$ and sends $(\mathbf{e_a}, \mathbf{e_b})$ to $\mathcal{V}$.
- On Open, $\mathcal{V}$ samples a random query $\alpha \in \mathbb{F}$ and sends $\alpha$ to $\mathcal{P}$.
- $\mathcal{P}$ computes $\mathbf{v} := \mathbf{a}\alpha + \mathbf{b}$ and sends $\mathbf{v}$ to $\mathcal{V}$.
- $\mathcal{V}$ samples a random vector $\mathbf{r} \in \mathbb{E}^n$ and sends $\mathbf{r}$ to $\mathcal{P}$.
- Both $\mathcal{P}$ and $\mathcal{V}$ compute $\mathbf{e_v} := E(\mathbf{v})$, $\mathbf{e_{v'}} := \mathbf{e_a}\alpha + \mathbf{e_b}$, and $\mathbf{e_x} := (\mathbf{r}, \mathbf{e_v} - \mathbf{e_{v'}})$ under homomorphic operations.
- $\mathcal{P}$ constructs a proof $\pi := \text{Open}_{\text{AHE}}(\mathbf{e_x})$ and sends $\pi$ to $\mathcal{V}$.
- $\mathcal{V}$ computes $\text{Verify}_{\text{AHE}}(\pi, \mathbf{e_x})$ and returns the result.

Fig. 1

Protocol $\Pi_{\text{W-LP-COM}}$: Weak line-point commitment protocol.

Parametrized by a finite field $\mathbb{F}$, an extension field $\mathbb{E}$, a length $n$, a code $\mathcal{C}$, a subvector commitment scheme SVC and integers $L, E, q$.

- $\mathcal{P}$ chooses inputs $\mathbf{a} \in \mathbb{F}^n$ and $\mathbf{b} \in \mathbb{E}^n$, with $\mathbf{b}$ chosen uniformly at random, and pads them with $q$ random values in $\mathbb{F}$ and $\mathbb{E}$, respectively, giving padded vectors $\bar{\mathbf{a}} \in \mathbb{F}^{n+q}, \bar{\mathbf{b}} \in \mathbb{E}^{n+q}$.
- $\mathcal{P}$ constructs codewords $c_a, c_b \in \mathcal{C}$ that decode to $\bar{\mathbf{a}}, \bar{\mathbf{b}}$, respectively.
- $\mathcal{P}$ calls $c := \text{Com}_{\text{SVC}}$ on the vector formed by concatenating entries of $c_a$ and $c_b$, i.e. $c = \text{Com}_{\text{SVC}}((c_{a,i}, c_{b,i})_i)$.
- $\mathcal{P}$ sends $c$ to $\mathcal{V}$.
- $\mathcal{V}$ sends a query $\alpha \in \mathbb{F}$ to $\mathcal{P}$.
- $\mathcal{P}$ sends the vector $\mathbf{v} := \mathbf{a}\alpha + \mathbf{b}$ to $\mathcal{V}$, allowing both parties to compute the codeword $c_v := c_a \alpha + c_b$.
- $\mathcal{V}$ chooses a random subset $\mathbf{q}$ of size $q$ from the set $n+1, \ldots, n+L(n+q)$ and sends it to $\mathcal{P}$.
- $\mathcal{P}$ sends the values $(c_{a,i})_{i \in \mathbf{q}}$ to $\mathcal{V}$, along with $\pi := \text{Open}_{\text{SVC}}((c_{a,i})_{\mathbf{q}}, (c_{b,i})_{\mathbf{q}}, c)$.
- $\mathcal{V}$ computes $(c_{b,i})_{\mathbf{q}}$ from $c_v$ and $(c_{a,i})_{\mathbf{q}}$ and returns $\text{Ver}_{\text{SVC}}(\pi, (c_{a,i})_{\mathbf{q}}, (c_{b,i})_{\mathbf{q}}, c)$.

Fig. 2

EFFICIENT PUBLICLY-VERIFIABLE ZERO-KNOWLEDGE PROOF SYSTEM WITH REDUCED PROOF SIZE

CROSS-REFERENCE TO RELATED APPLICATION

This application claims the benefit of U.S. Provisional Application Ser. No. 63/502,072 filed May 12, 2023, the content of which is incorporated by reference herein in its entirety.

FIELD OF THE INVENTION

The present disclosure relates to cryptographic methods and systems, specifically to methods for generating cryptographic proofs that enable a prover to demonstrate the validity of a statement related to private data without revealing the data itself, ensuring secure interactions among parties that may not fully trust each other.

BACKGROUND OF THE INVENTION

Zero knowledge proof systems are technologies that enhance data privacy and security by enabling a computing device to demonstrate, with high probability, the validity of an encoded statement related to private data in a manner that can be verified by other computing devices, without granting those other computing devices access to the private data, and moreover without leaking any extraneous information about the private data to any other entity. Concrete, practical applications of zero knowledge proof systems have arisen in recent years in diverse areas including verifiable execution of secret machine-learning models; privacy-preserving compliance verification; and secure, privacy-preserving transaction authentication in blockchain networks and beyond.

Non-interactive, publicly verifiable zero knowledge proof systems are particularly well suited to applications in which a single statement regarding private data needs to be verified by a large number of distinct computing devices, without incurring large communication costs between each of those computing devices and the computing device demonstrating the validity of the statement. The large size of proofs generated by many existing zero knowledge proof systems impedes the ability to address such applications at scale. Moreover, in light of recent advances in quantum computing, non-interactive zero knowledge proof systems providing plausible post-quantum security due to minimal cryptographic assumptions have become increasingly desirable; however, recent approaches to developing zero knowledge succinct non-interactive arguments of knowledge (zk-SNARKs) have frequently yielded large proof sizes. It is accordingly desirable to obtain non-interactive zero knowledge proof systems that can be practically implemented with efficient proof sizes and configured for large-scale applications with plausible post-quantum security. It is against this background that a need arose to develop the techniques described herein.
Zero Knowledge Zero knowledge proof systems (also referred to herein as "zero knowledge proof protocols" or simply "zero knowledge protocols") are a collection of approaches to demonstrate the truth of some fact while hiding secret information on which the truth of that fact depends. Theoretical study and concrete implementations of zero knowledge share a common language for analyzing zero knowledge protocols and describing the security guarantees they provide.

In the language of zero knowledge protocols, the fact is referred to as a statement, and can be represented mathematically. In many common settings where zero knowledge is used, the statement can be efficiently verified on a computing device with access to additional private data known as a witness. A prover party holds and/or can access the statement and, when applicable, the witness, and needs to construct a zero knowledge proof. One or more other verifier parties hold and/or can access the statement and do not have access to the witness. The prover party needs to convince the verifier parties that the statement is true without allowing the verifier parties to access the witness, or indeed any information that could be inferred from the witness besides the truth of the statement. In the context of this invention, prover parties and verifier parties are also referred to simply as "provers" and "verifiers." Moreover, prover and verifier parties are computing devices, each connected to a communication channel; in certain embodiments of the invention, a prover party and a verifier party may each be components of a single larger computing device. The prover and (each) verifier are mutually untrusting, in the sense that the verifier device requires a verifiable demonstration of the truth of the statement from the prover device, while the prover device is required not to leak information about the private-data witness to the verifier device.

Zero knowledge protocols can be classified based on the kinds of interaction the prover and the verifier or verifiers must engage in. In designated verifier zero knowledge protocols, the prover interacts with a single verifier party, and the proof is non-transferable; no other verifier party can gain the same certainty as the designated party. In public verifier zero knowledge protocols, on the other hand, the prover constructs a proof which can then be transferred to any number of other verifier parties, which can each verify the correctness of the proof. The zero knowledge protocols described herein are public verifier zero knowledge protocols.

Another further classification of zero knowledge proofs is into those which possess the proof of knowledge property; such a zero knowledge proof is referred to as a zero knowledge proof of knowledge. This property is a security guarantee which allows the prover to convince the verifier not only that some witness exists which demonstrates the statement to be true, but that the prover is in possession of this witness. Protocols according to embodiments of the present invention have this stronger proof of knowledge property.

One common way that statements are represented for use in zero knowledge protocols is in the language of the satisfiability of an arithmetic circuit. As understood in the art, an arithmetic circuit is specified by the choice of a finite field, a collection of wires taking values in the finite field, and gates connecting the wires that perform the operations of addition and multiplication over the finite field. Wires and their wire values are referred to as input wires, output wires, or intermediate wires and their input wire values, output wire values, and intermediate wire values, based on whether the wires play the role of inputs to a gate only, outputs of a gate only, or both roles, respectively.

An arithmetic circuit satisfiability problem is specified by giving an arithmetic circuit together with all of the output wire values and some of the input wire values. The specified input wires are called public inputs, and a satisfying assignment of the arithmetic circuit is an assignment of the remaining wire values in the arithmetic circuit such that the output wire values agree with the pre-specified values (often zero), and the assignment of wire values is consistent with the addition and multiplication operations performed by the gates of the arithmetic circuit. In this setting, the private-data witness is encoded as the values of the non-public (that is, unspecified) input wires in a satisfying assignment of the arithmetic circuit.

Line Point Zero Knowledge

A line-point zero knowledge (LPZK) proof system is a particular variety of designated verifier zero knowledge proof systems for the problem of arithmetic circuit satisfiability.

In a line-point zero knowledge proof system, the prover provides two input vectors, represented symbolically as a, b, which are collectively referred to in the context of the present invention as the prover-input vectors. The verifier provides a random value $\alpha$, referred to as the verifier-input random value. Additionally, both parties have access to a black box protocol which allows the verifier to learn a linear combination of the prover-input vectors according to the verifier-input random value; that is, the verifier learns either $v:=a\alpha+b$ or $v:=a+b\alpha$. This vector v is referred to as the line-point evaluation output vector. Descriptions of embodiments of the invention herein may choose one or the other of these forms of the line-point evaluation output vector of a line-point zero knowledge proof system for the sake of simplicity. In certain embodiments of the invention, the black box protocol can be realized in practical applications through the use of a vector oblivious linear evaluation protocol, or VOLE protocol, as described in more detail below.

In a line-point zero knowledge proof system, the prover-input vectors collectively comprise the witness (that is, the non-public input wire values) and intermediate wire values of a satisfying assignment of the arithmetic circuit, along with random values, and the communication necessary for the verifier to learn the line-point evaluation output vector comprises the proof.

Additionally, a line-point zero knowledge proof system specifies a set of polynomials over a finite field which the verifier evaluates on the verifier-input random value and the elements of the line-point evaluation output vector. If these polynomials all evaluate to zero over the finite field, then the line-point zero knowledge proof system has the property that the verifier is convinced of the statement and the stronger proof of knowledge property described above. In this case, the line-point zero knowledge proof system outputs a polynomial-relationship satisfied state, and the verifier accepts the proof. If any of the polynomials do not evaluate to zero, then the verifier will not be convinced by the proof. In this case, the line-point zero knowledge proof system outputs a polynomial-relationship unsatisfied state, and the verifier rejects the proof.

BRIEF SUMMARY OF THE INVENTION

Disclosed herein is a new public-verifier non-interactive zero knowledge proof system that requires no cryptographic assumptions other than collision-resistant hash functions, which is compiled via the Fiat-Shamir transform in the random oracle model from a non-succinct interactive line-point zero knowledge proof system.

According to an aspect of the present disclosure, a method for generating a proof of a statement related to private data while maintaining security among mutually untrusting parties includes executing at a first computing device operating as a prover party. The method includes securely storing the private data, wherein the private data is not provided to at least one of the verifier parties. The method also includes storing the statement, wherein the validity of the statement is capable of being encoded as satisfiability of an arithmetic circuit over a field. The method further includes computing a first vector A, wherein the first vector A comprises uniformly random first elements of an extension of the field. The method also includes computing a second vector B based on the private data, wherein the second vector B comprises intermediate circuit-wire values of the arithmetic circuit based on the statement, and wherein the intermediate circuit-wire values are elements of the field.

According to other aspects of the present disclosure, the method may include generating a message m1 representing a commitment to the first vector A and the second vector B. The method may also include computing a value alpha as a result of a collision resistant hash function applied to the message m1. The method may further include generating a message m2 comprising a third vector, wherein the third vector is the line-point evaluation output vector of the LPZK proof system. The method may also include generating a message m3 representing a zero knowledge proof of knowledge that the first computing device correctly calculated the message m1, the value alpha, and the message m2, based on the first vector A and the second vector B. The method may also include storing the messages m1, m2, and m3 on a computerized storage device, such that they are electronically accessible to one or more of the verifier parties by a network device, as a proof that the statement is valid.

According to another aspect of the present disclosure, a system for generating a proof of a statement related to private data while maintaining security among mutually untrusting parties includes a computerized processor configured for executing at a first computing device operating as a prover party. The system includes securely storing the private data, wherein the private data is not provided to at least one of the verifier parties. The system also includes storing the statement, wherein the validity of the statement is capable of being encoded as satisfiability of an arithmetic circuit over a field. The system further includes computing a first vector A, wherein the first vector A comprises uniformly random first elements of an extension of the field. The system also includes computing a second vector B based on the private data, wherein the second vector B comprises intermediate circuit-wire values of the arithmetic circuit based on the statement, and wherein the intermediate circuit-wire values are elements of the field.

According to other aspects of the present disclosure, the system may include generating a message m1 representing a commitment to the first vector A and the second vector B. The system may also include computing a value alpha as a result of a collision resistant hash function applied to the message m1. The system may further include generating a message m2 comprising a third vector, wherein the third vector is the line-point evaluation output vector of the LPZK proof system. The system may also include generating a message m3 representing a zero knowledge proof of knowledge that the first computing device correctly calculated the message m1, the value alpha, and the message m2, based on the first vector A and the second vector B. The system may also include storing the messages m1, m2, and m3 on a computerized storage device, such that they are electronically accessible to one or more of the verifier parties by a network device, as a proof that the statement is valid.

According to yet another aspect of the present disclosure, a non-transitory computer-readable media includes executable instructions configured for generating a proof of a statement related to private data while maintaining security among mutually untrusting parties. The media includes instructions for executing at a first computing device operating as a prover party. The media includes securely storing the private data, wherein the private data is not provided to at least one of the verifier parties. The media also includes storing the statement, wherein the validity of the statement is capable of being encoded as satisfiability of an arithmetic circuit over a field. The media further includes computing a first vector A, wherein the first vector A comprises uniformly random first elements of an extension of the field. The media also includes computing a second vector B based on the private data, wherein the second vector B comprises intermediate circuit-wire values of the arithmetic circuit based on the statement, and wherein the intermediate circuit-wire values are elements of the field.

According to other aspects of the present disclosure, the media may include generating a message m1 representing a commitment to the first vector A and the second vector B. The media may also include computing a value alpha as a result of a collision resistant hash function applied to the message m1. The media may further include generating a message m2 comprising a third vector, wherein the third vector is the line-point evaluation output vector of the LPZK proof system. The media may also include generating a message m3 representing a zero knowledge proof of knowledge that the first computing device correctly calculated the message m1, the value alpha, and the message m2, based on the first vector A and the second vector B. The media may also include storing the messages m1, m2, and m3 on a computerized storage device, such that they are electronically accessible to one or more of the verifier parties by a network device, as a proof that the statement is valid.

BRIEF DESCRIPTION OF THE DRAWINGS

Non-limiting and non-exhaustive examples are described with reference to the following figures.

FIG. 1 depicts an example of a line-point commitment protocol utilizing a homomorphic encryption scheme according to particular embodiments of the invention.

FIG. 2 depicts an example of an interactive weak line-point commitment protocol, which can be compiled to a non-interactive protocol according to particular embodiments of the invention.

DETAILED DESCRIPTION

Figure 3:
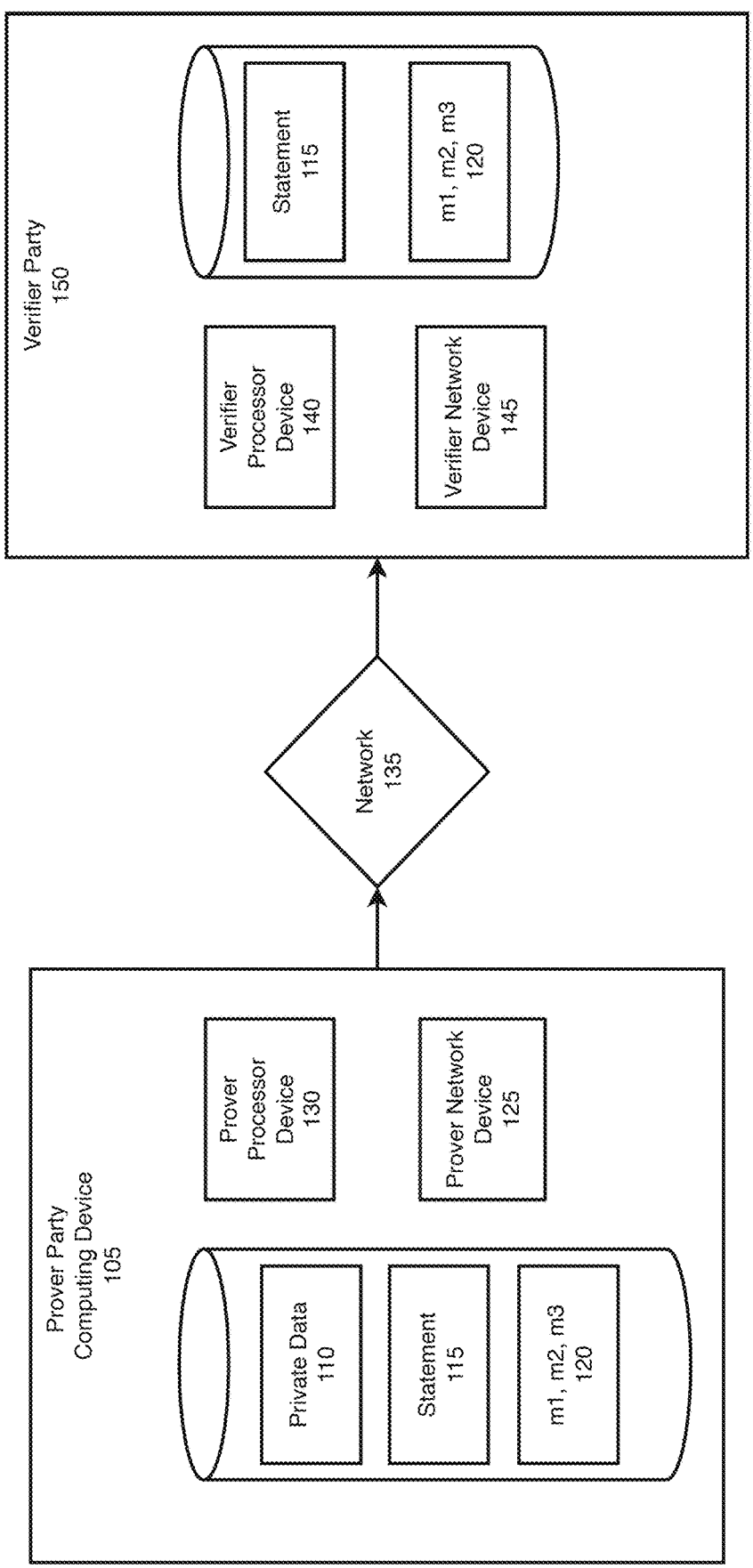
FIG. 3 illustrates a system for generating and verifying zero-knowledge proofs, according to aspects of the present disclosure.

The following description sets forth exemplary aspects of the present disclosure. It should be recognized, however, that such description is not intended as a limitation on the scope of the present disclosure. Rather, the description also encompasses combinations and modifications to those exemplary aspects described herein.

Main Technical Ideas

Line-Point Commitments and Line-Point Zero Knowledge.

In an LPZK proof system a prover party $\mathcal{P}$ constructs from its witness $w \in \mathbb{F}^n$ a pair of vectors $a \in \mathbb{F}^n$, $b \in \mathbb{E}^n$ that collectively both encode and mask the witness w, and the verifier party $\mathcal{V}$, upon receiving the pair $(\alpha, v_\alpha := a\alpha + b)$, for $\alpha \in \mathbb{E}$, determines whether to accept or reject the proof. Here $\mathbb{F}$ and $\mathbb{E}$ are finite fields, with $\mathbb{E}$ a field extension of $\mathbb{F}$. In embodiments of the invention, the field extension $\mathbb{E}$ may be of degree 1 over $\mathbb{F}$ (i.e., it may be the case that $\mathbb{E} = \mathbb{F}$).

Embodiments of the invention may be better understood by introducing a basic primitive called a "line-point commitment," where $\mathcal{P}$ commits to a line $at+b$, $\mathcal{V}$ queries a point $\alpha$ on that line, and $\mathcal{P}$ opens $a\alpha + b$ to $\mathcal{V}$; the ideal functionality of this primitive is specified as follows:

Ideal functionality $\mathcal{F}_{LP\text{-}COM}$: Line point commitments.
Parametrized by finite fields $\mathbb{F}, \mathbb{E}$, with $\mathbb{E}$ an extension of $\mathbb{F}$ and a length n.
$\mathcal{P}$ sends $(a, b) \in \mathbb{F}^n \times \mathbb{E}^n$ to $\mathcal{F}_{LP\text{-}COM}$.
$\mathcal{V}$ sends $\alpha \in \mathbb{E}$ to $\mathcal{F}_{LP\text{-}COM}$.
$\mathcal{F}_{LP\text{-}COM}$ sends $\alpha$ to $\mathcal{P}$ and $v := a\alpha + b$ to $\mathcal{V}$.
$\mathcal{V}$ outputs acc.

The purpose of this commitment scheme is that it allows for a realization of the VOLE functionality in the public verifier setting, enabling compilation from LPZK proof systems to publicly verifiable non-interactive zero knowledge proof systems (NIZKs). The resulting Interactive Proof protocol is as follows:

Protocol $\Pi_{IP\text{-}LPZK}$: Interactive Proofs from LPZK and LP-COM.
Given a LPZK scheme, a LP-COM scheme, fields $\mathbb{F}, \mathbb{E}$, and a circuit C and witness w over $\mathbb{F}$, with w held by the prover:
$\mathcal{P}$ calls Prove $(\mathbb{F}, \mathbb{E}, C, w)$ to obtain $(a, b)$, with $a \in \mathbb{F}^n$ and $b \in \mathbb{E}^n$.
$\mathcal{P}$ calls $c := \text{Com}_{LP}(a, b)$ and sends the resulting commitment c to $\mathcal{V}$.
$\mathcal{V}$ sends a query $\alpha$ to $\mathcal{P}$.
$\mathcal{P}$ sends $\pi := \text{Open}_{LP}(c, \alpha, v := a\alpha + b)$ to $\mathcal{V}$.
$\mathcal{V}$ calls $\text{Verify}_{LP}(\pi, c, \alpha, v)$, and if this returns acc, calls Verify($\mathbb{F}, \mathbb{E}, C, \alpha, v$), and returns the result.

This Interactive Proof can be made non-interactive using the Fiat-Shamir transform; that is, the query $\alpha$ can be determined by hashing the Line-Point commitment c to a and b computed in the LPZK proof.

The obstacle to building a Line-Point Commitment directly from standard VOLE generators is that, in standard VOLE generators, it is the prover that acts as receiver and the verifier that acts as sender (in other words, it would be possible to choose v before choosing $\alpha$, but it is not known how to choose a and b before choosing $\alpha$).

Subvector Commitments from Merkle Trees.

Subvector Commitments are a cryptographic primitive generalizing the Vector Commitments known in the art, for committing to a vector and efficiently opening the vector on some subset of indices to be determined later, while leaking no information about the rest of the vector.

Although succinct constructions of Subvector Commitments exist, where the opening cost is sublinear in the size of the vector and in the size of the subset of indices to open, they require additional cryptographic assumptions. Subvector Commitments used in certain embodiments of the present invention utilize a standard Merkle tree commitment, with the path-pruning optimization, where all digests not reached along any path whose sibling node is reached along some path are sent. As described further below, employing this optimization saves 5 kilobytes per proof at the 128-bit security level.

VOLE-in-the-Clear

As described herein, Line-Point Commitments by combining Subvector Commitments with Linear Error Correcting Codes are obtained. The prover pads the vectors a, b with q random values, and then chooses a maximum-distance separable code C (for simplicity, the current description uses Reed-Solomon codes), and computes the codewords $c_a$, $c_b$ that correspond to the padded vectors $\bar{a}$, $\bar{b}$. The prover then constructs Subvector Commitments to $c_a$ and $c_b$ and sends these commitments to the verifier. The verifier responds with a query $\alpha$, and the prover sends $c_v:=c_a\alpha+c_b$. Then the verifier queries the Subvector Commitments at q random points, and confirms that these points agree with $C_v$.

The disclosed realization of LP-Com is referred to as VOLE-in-the-clear because the prover sends the entire VOLE output to the verifier in the clear. Surprisingly, this incurs little to no additional asymptotic cost compared to using pseudo-random generators for VOLE; when the system succinctly generates random VOLE, it still has to send one field element per VOLE instance to convert to fixed VOLE. Subfield VOLE could potentially out-perform both approaches, but current best approaches for succinctly generating subfield VOLE require $\lambda/\rho$ communication per subfield element at a cost of $2^\rho$ increase in computation.

Low Degree Polynomials without Low Degree Checks.

The above explanation elides the important matter of ensuring that a cheating prover cannot choose the codeword $c_v$ maliciously after the choice of $\alpha$ to agree with some subset of the subvector commitments to (possibly malformed) codewords $c_a$, $c_b$.

In other protocols built on Reed-Solomon codes or other codes, the standard approach is to require a low-degree polynomial check to confirm that the committed vectors are $\epsilon$-close to a codeword in the linear code.

In the VOLE-in-the-clear setting, this check is omitted entirely. The verifier can check, of course, that $C_v$ is a codeword. But the binding requirement can be relaxed considerably, allowing the vectors a, b to be far from any codeword in the linear code. What is required instead is that the prover has a limited number of pairs $(a_i, b_i)$ to choose from to construct the vector $v:=a\alpha+b$; the system can even allow the prover to choose the pair $(a_i, b_i)$ after receiving the value $\alpha$ from the verifier.

If the prover is restricted to being able to choose at most E pairs $(a_i, b_i)$, then by a union bound, the soundness error of the resulting protocol is at most E times the soundness error of the underlying LPZK protocol. As described below, a $[(E^2+E)/2(n+q), (n+q), (E^2+E-2)/2(n+q)+1]$-code will restrict the prover to being able to choose at most E candidates $(a_i, b_i)$, with soundness error $1/2^\lambda$ if $q>\lambda/\log(E/2)$.

1 Related Technical Background

Vector Oblivious Linear Evaluation (VOLE)-Based Protocols.

The vector oblivious linear evaluation (VOLE) functionality known in the art was introduced in the context of giving algorithms for generating random seeds that are sublinear in the size of the resulting VOLE correlations.

Randomized Line Point Zero Knowledge

Certain embodiments of the invention may make use of randomized LPZK, which treats the vectors a, b, as distinct from the prover's message m. This allows us to distinguish between messages sent before and after committing to the pair of vectors (a, b), which is necessary for allowing the prover to adjust certain entries of VOLE on the basis of Random Oracle queries before learning $\alpha$.

Definition 1 (rLPZK). A randomized line-point zero-knowledge (rLPZK) proof system for arithmetic circuit satisfiability is a pair of algorithms (Prove, Verify) with the following syntax:

Prove ($\mathbb{F}$, C, w, a, b) is a (deterministic) polynomial-time algorithm that given an arithmetic verification circuit C: $\mathbb{F}^k \to \mathbb{F}^{k'}$, a witness w$\in \mathbb{F}^k$, and a pair of vectors a, b$\in \mathbb{F}^n$, outputs a message m$\in \mathbb{F}^n$. It is assumed that the dimension n is determined by C. One can think of $v(t)+m:=at+b$ as a random affine line and $v(t)+m=at+(b+m)$ as a translation of that line.

Verify($\mathbb{F}$, C, a, $v_\alpha$, m) is a polynomial-time algorithm that, given an evaluation $v_\alpha$ of the line $v(t)$ at some point $\alpha\in \mathbb{F}$ and the message (translation vector) m, outputs acc or rej.

The algorithms (Prove, Verify) should satisfy the following:

Completeness. For any arithmetic circuit C: $\mathbb{F}^k \to \mathbb{F}^{k'}$ and witness w$\in \mathbb{F}^k$ such that $C(w)=0$, and for any fixed a, b, $\in \mathbb{F}^n$, $\alpha\in \mathbb{F}$, there is $Pr[a,b \xleftarrow{R} \mathbb{F}^n, m \leftarrow \text{Prove}(\mathbb{F},C,w,a,b):\text{Verify}(\mathbb{F},C,\alpha, v(\alpha),m)=acc]=1$.

Reusable $\epsilon$-soundness. For every arithmetic circuit C: $\mathbb{F}^k \to \mathbb{F}^{k'}$ such that $C(w)\ne 0$ for all w$\in \mathbb{F}^k$, and every (adversarially chosen) line $v^*(t)=a^*t+b^*$, and translation vector $m^*$ where the length n of $v^*$ depends on C as above, it is the case that $Pr[\alpha \xleftarrow{R} \mathbb{F}:\text{Verify}(\mathbb{F},C,\alpha,v^*(\alpha),m^*)=acc]\le \epsilon$.

Moreover, for every $\mathbb{F}$, C, $v^*(t)$ the probability of Verify accepting (over the choice of $\alpha$) is either 1 or $\le \epsilon$. Unless otherwise specified, it is assumed $\epsilon \le O(1/|\mathbb{F}|)$.

Perfect zero knowledge. There exists a probabilistic polynomial time (PPT) simulator Sim such that, for any arithmetic circuit C: $\mathbb{F}^k \to \mathbb{F}^{k'}$, any witness w$\in \mathbb{F}^k$ such that $C(w)=0$, and any $\alpha \in \mathbb{F}$, the output of Sim($\mathbb{F}$, C, $\alpha$) is distributed identically to the distribution of $(a\alpha+b,\text{Prove}(\mathbb{F},C,w,a,b))$, over uniformly random and independently sampled a, b$\in \mathbb{F}^n$.

Proof of Knowledge property. There exists an efficient polynomial time extractor Ext such that, for any arithmetic circuit C: $\Gamma\mathbb{F}^k \to \mathbb{F}^{k'}$, and vectors $a^*$ $b^*$, $m^*$ such that $Pr[\alpha \xleftarrow{R} \mathbb{F}: \text{Verify}(\mathbb{F}, C, \alpha, a^*(\alpha)+b^*, m^*)=acc] > \epsilon$, taking $w:=\text{Ext}(\mathbb{F}, C, a^*, b^*, m^*)$, it is the case that $C(w)=0$.

In the description of embodiments of the invention herein, LPZK is primarily treated as a black box. Key features of LPZK that are relevant for certain constructions described herein are:

1 element of communication per gate in the random oracle model (ROM).

Linear computation, with a concretely efficient prover and verifier that need to perform only a handful of field multiplications and additions per gate.

Soundness proportional to $$O\left(\frac{1}{|\mathbb{F}|}\right).$$

2 Line Point Commitments

The culmination of this section is the protocol IIW-LP-COM in FIG. 2 and the result of Lemma 4, which shows how to implement weak Line Point Commitments, and the relationship between the level of "weakness" and other efficiency features.

In some embodiments, the method can begin by stating the formal definition of a Line-Point Commitment scheme, which is a sort of "ideal-world" primitive; this functionality is used as a baseline reference to weak line point commitments described in section 2.3.

Definition 2 (Line-Point Commitment). A line-point commitment scheme LP-Com is a commitment scheme consisting of the algorithms (Commit, Open, Verify) with the following syntax:

c=Commit(a, b, $\mathbb{F}$, , n) is a commitment to a pair of vectors a, b∈$\mathbb{F}$ $^n$.

Open(c, α, $\mathbb{F}$, , n) returns the pair (aα+b, π), where π is a proof of correctness.

Verify(c, α, v, π, $\mathbb{F}$, , n) checks whether the vector v is equal to aα+b and returns acc or rej.

This must satisfy the following

Computationally hiding: Any computationally bounded adversary cannot distinguish between commitments c:=Commit(a, b, $\mathbb{F}$, , n) and a commitment c':=(a', b', $\mathbb{F}$, , n). If aα+b=a'α+b' and the computationally bounded adversary holds Open(c*, α, $\mathbb{F}$, , n), where c* is the commitment they hold, the adversary still cannot distinguish between c and c'.

Computationally binding: Any computationally bounded adversary has a negligible probability of producing a commitment c and two distinct vectors v, v' and two proofs T, T' such that Verify(c,α,v,π, $\mathbb{F}$, ,n)=Verify(c,α,v',π', $\mathbb{F}$, ,n)=acc.

The following can be proven:

Lemma 1. Assuming the correctness of the underlying LPZK proof system, the protocol $\Pi_{IP\text{-}LPZK}$ is an Interactive Proof protocol with completeness, soundness, and zero knowledge in the LP-COM-hybrid model.

2.1 Line-Point Commitment from Additive Homomorphic Encryption

In some embodiments, the method can begin with the realization of a line-point commitment from an additive homomorphic encryption scheme. This requires an additive homomorphic encryption scheme $$AHE(E, \text{Open}_{AHE}, \text{Verity}_{AHE}),$$

where E(•) is an additive homomorphic encryption such that E(x+y)=E(x)+E(y) and E is IND-CPA secure, and where Open$_{AHE}$(E(x), x, C) generates a proof π that C(E(x)) is an encryption of zero, where C is a circuit made up of addition and scalar multiplication gates, and Verify$_{AHE}$(π, E(x)) verifies that x is an encryption of zero. Verify$_{AHE}$ is said to generate a "ciphertext-zero state" if Verify$_{AHE}$(π, E(x)) is a successful verification that x is an encryption of zero, and to generate a "ciphertext-nonzero state" otherwise. Where clear from context, descriptions herein may use the notations x:=C(x) and Open$_{AHE}$(E(x)) for Open$_{AHE}$(E(x), x, C).

In the context of the present invention, a "homomorphic operation" is an operation f that can be applied to pairs of ciphertexts, each ciphertext encrypting a plaintext vector of a given length over a field $\mathbb{K}$ under a homomorphic encryption E, such that f(E(x), E(y)) is an encryption under E of a $\mathbb{K}$- -linear map on the plaintext vectors x and y.

FIG. 1 presents an example of a line-point commitment protocol utilizing a homomorphic encryption scheme according to particular embodiments of the invention.

The following can be proven:

Lemma 2. The protocol $\Pi_{LP\text{-}COM\text{-}AHE}$ in FIG. 1 realizes the line point commitment functionality.

2.2 Subvector Commitments from Merkle Trees

A definition of the Subvector Commitment functionality is provided, which can be realized with a Merkle tree construction.

Ideal functionality $\mathcal{F}_{SVC}$(q, n): Subvector commitments. Parametrized by a security parameter λ, a sample space S, and integers q, n.

$\mathcal{P}$'s input is a vector a∈S$^n$.

$\mathcal{V}$'s input is a query set q⊆1, 2, . . . , n with |q|=q.

$\mathcal{F}_{SVC}$ outputs q to $\mathbb{F}$, and $(a_i)_{i \in q}$ to $\mathcal{V}$.

Definition 3 (Subvector Commitment). A Subvector Commitment Scheme SVC is a commitment scheme consisting of the algorithms (Commit, Open, Verify) with the following syntax:

c=Commit(a, $\mathbb{F}$, , q, n) is a commitment to a vector a∈$\mathbb{F}$ $^n$.

Open(c, I, $\mathbb{F}$, , q, n) returns the sequence $(a_i)_{i \in I}$ and a proof π of correctness, for I⊆[n] with |I|=q.

Verify(c, I, o, π, $\mathbb{F}$, , g, n) checks whether the vector o satisfies $o_j = a_{i_j}$ for all $i_j \in I$, and returns acc or rej.

This must satisfy the following

Computationally hiding: Any computationally bounded adversary cannot distinguish between commitments c:=Commit(a, $\mathbb{F}$, , q, n) and a commitment c':=(a', $\mathbb{F}$, , q, n), even if $\mathcal{A}$ knows that a=a' on a set I and knows the values a takes on that set.

Computationally position binding: Any computationally bounded adversary has a negligible probability of producing a commitment c, a set I, and two distinct vectors o, o' and two proofs π, π' such that Verify(c, I, o, π, $\mathbb{F}$, , q, n)=Verify(c, I, o, π, $\mathbb{F}$, , q, n)=acc.

In certain embodiments of the invention, the subvector commitment functionality is realized such that the commitment c appearing in Definition 3 is a Merkle tree commitment. An advantage of such embodiments is that such a commitment requires only 2λ bits of communication. After the verifier sends a query set q of indices, the system can use the path-pruning optimization, where the prover responds with the maximal nodes in the tree that do not lie along any of the q paths to the q leaf indices (maximal with respect to depth, when the root of the Merkle tree has depth 0 and the leaves have depth −log n).

The following can be proven, which gives a lower bound on the savings from the path-pruning optimization. The savings do not affect the asymptotic performance unless q is close to n, but enable a substantial difference in concrete implementations; at the 128-bit security level there is q=32, so path-pruning reduces total communication by 5.12 kilobytes.

Lemma 3. Using the path-pruning optimization described above, a Merkle tree realizes the subvector commitment functionality $\mathcal{F}_{SVC}$, with total communication of at most 2λ+q(log |S|+λ)+2qλ(log(n)−log(q)) bits.

2.3 Weakening Line Point Commitments

For the purpose of describing embodiments of the invention, the notion of line point commitments can be weakened in the following way. The system can make the commitment weakly binding, allowing the prover to select several different choices of lines, and, upon being asked to open a point on the line, choose which line to use.

Definition 4 (Weak Line-Point Commitment). A Weak line-point commitment scheme W-LP-Com is a commitment scheme consisting of the algorithms (Commit, Open, Verify) with the following syntax:

c=Commit($a_i$, $b_i$, E, $\mathbb{F}$, , n) is a commitment to a sequence of E pairs of vectors $a_i$, $b_i$∈$\mathbb{F}$ $^n$.

Open(c, α, i, $\mathbb{F}$, , n) returns the pair ($a_i$α+$b_i$, π), where π is a proof of correctness.

Verify(c, α, v, π, $\mathbb{F}$, , n) checks whether the vector v is equal to $a_i$α+$b_i$, for some i and returns acc or rej.

This must satisfy the following

Computationally hiding: A computationally bounded adversary cannot distinguish between commitments c:=Commit(($a_i$, $b_i$)$_i$, $\mathbb{F}$, , n) and a commitment c':=(($a_i'$, $b_i'$)$_i$, $\mathbb{F}$, , n). If v:=$a_i$α+$b_i$=$a_j'$α+$b_j'$ for some pair (i,j), and the computationally bounded adversary holds (v, π):=Open(c*, α, $\mathbb{F}$,, n), where c* is the commitment they hold, the adversary still cannot distinguish between c and c'.

Weakly computationally binding: Any computationally bounded adversary has a negligible probability of producing a commitment c and E+1 pairs of vectors $$((a_1,b_1), \ldots, (a_{E+1},b_{E+1})),$$

a value α, and proofs $\pi_1, \ldots, \pi_{E+1}$ such that

Verify(c,α,$a_i$,α+$b_i$,π, $\mathbb{F}$,,n)=acc for i=1, 2, . . . , E+1.

The ideal functionality of weak link point commitments is specified as follows:

Ideal functionality $\mathcal{F}_{W\text{-}LP\text{-}COM}$: weak line point commitments.

Parametrized by a finite field $\mathbb{F}$,, a subset S⊆$\mathbb{F}$,, a parameter E and a length n.

For i=1, . . . , E, $\mathcal{P}_1$ sends $(a_i, b_i) \in S^n \times \mathbb{F}^n$ to $\mathcal{F}_{W\text{-}LP\text{-}COM}$.

$\mathcal{P}$ sends α∈ $\mathbb{F}$ to $\mathcal{F}_{W\text{-}LP\text{-}COM}$.

$\mathcal{F}_{W\text{-}LP\text{-}COM}$ sends α to $\mathcal{P}$.

$\mathcal{P}$ sends i∈{1, . . . , E} to $\mathcal{F}_{W\text{-}LP\text{-}COM}$.

$\mathcal{F}_{W\text{-}LP\text{-}COM}$ sends v:=$a_i$α+$b_i$ to $\mathcal{P}$.

$\mathcal{P}$ outputs acc.

To assist in understanding embodiments of the invention, an interactive protocol realizing this weak line-point commitment functionality is shown in FIG. 2. In certain embodiments, such an interactive protocol is compiled to a non-interactive protocol via the Fiat-Shamir transform.

The following can be proven:

Lemma 4. Choose parameters E, q with $\log_2((E+1)/2)$ q>λ, and let $\mathcal{C}$ be a $$\left[ \frac{E^2+E}{2}(n+q), (n+q), \frac{E^2+E-2}{2}(n+q)+1 \right]$$

code. Then $\Pi_{W\text{-}LP\text{-}COM}(\mathbb{F},, S, n, C,$ $$\frac{E^2+E}{2},$$

E, q, c) is a weak line point commitment scheme with parameters ($\mathbb{F}$, S, E–1, n) in the $\mathcal{F}_{SVC}(S \times \mathbb{F},, q,$ $$\frac{E^2+E}{2}$$

(n+q))-hybrid model with soundness error $1/2^\lambda$.

2.4 Description of Main Protocols

In embodiments of the invention, full public-verifier non-interactive zero knowledge (NIZK) proof protocols are assembled from the ingredients described in the preceding discussion. This can be understood as a compilation of an interactive proof protocol, described in some embodiments by $\Pi_{IP\text{-}LPZK}$ as above, to a publicly verifiable NIZK using the Fiat-Shamir transform.

In embodiments of the invention, publicly verifiable LPZK protocols begin with a prover party holding private data encoded as a witness w, and a statement encoded as an arithmetic circuit C over a field $\mathbb{F}$. By invoking the Prove function of an LPZK protocol, the prover generates a pair of vectors (a, b) of length n, with a taking values in $\mathbb{F}$ and b taking values in an extension field $\mathbb{E}$ of $\mathbb{F}$.. As described above according to particular embodiments of the invention, the vector a is generated randomly, while the vector b contains all of the input wire values and the intermediate wire values from a satisfying assignment of the arithmetic circuit C, along with additional values used for performing checks on the multiplication gates of C.

The proof the prover will construct comprises a triple of three messages ($m_1$, $m_2$, $m_3$). The first message $m_1$ is generated as a commitment to the vectors a and b. In various embodiments of the invention, this commitment can be realized in various ways; approaches to realizing the commitment according to particular embodiments will be described in further detail below.

The prover generates a value α by applying a collision resistant hash function H to the message $m_1$, potentially with additional input to the hash function. In certain embodiments of the invention, the prover computes the values a by applying the collision resistant hash function H to a concatenation of the arithmetic circuit C and $m_1$, that is, a:=H(C|$m_1$). To assist in understanding, it is helpful to observe that in the interactive protocol $\Pi_{IP\text{-}LPZK}$ described above, the verifier chooses and transmits a to the prover in an interactive proof; for the purposes of creating non-interactive proofs according to embodiments of the invention, choosing α instead by a hash of the prover's inputs makes the protocol non-interactive and, according to the Fiat-Shamir heuristic, maintains security of the proof system.

The prover generates the second message $m_2$ as a line-point evaluation output vector of an LPZK protocol, to be sent in the clear. In certain embodiments of the invention, this line-point evaluation output vector takes the form v:=aα+b. It will be appreciated that in other embodiments of the invention, the message $m_2$ may be constructed according to essentially equivalent modified forms of line-point evaluation output vector. For example, in particular embodiments the prover may construct the line-point evaluation output vector v':=a+bα', since both parties can multiply $m_2$ by $\alpha^{-1}$.

The third message $m_3$ generated by the prover comprises a proof that the messages $m_1$ and $m_2$ are consistent with each other, which suffices to convince the verifier that the proof is correct. The resulting soundness error is the soundness error of the underlying LPZK proof system plus the soundness error of the final consistency check. In various embodiments of the invention, this proof can be realized in various ways, as will be described further below; in particular, this realization depends on the commitment scheme used by the prover to generate the message $m_1$.

In certain embodiments of the invention, one or more of the messages $m_1$, $m_2$, and $m_3$ are transmitted by the prover party to a verifier party utilizing a communication channel. In certain embodiments of the invention, one or more of the messages are transmitted to a server which is connected to a communication network.

A verifier party with access to messages $m_1$, $m_2$, and $m_3$ generated by a prover party according to an embodiment of the invention as described above verifies the correctness of the proof represented by the messages, by applying the underlying LPZK proof system on the message $m_2$ and the value α, outputting a polynomial-relationship satisfied or unsatisfied state. In order to do so, the verifier generates the value α using an equivalent method to that used by the prover party as described above, by applying the same collision-resistant hash function to the message $m_1$ and potentially additional inputs. The verifier also checks the proof given by $m_3$ that the messages $m_1$ and $m_2$ are consistent, which convinces the verifier that $m_2$ comprises the appropriate line-point evaluation output vector of the underlying LPZK proof system. If this check is successful, the verifier outputs a commitment-respected state; otherwise, the verifier outputs a commitment-violated state. Finally, if the verifier has outputted both a polynomial-relationship satisfied state and a commitment-respected state, the verifier outputs a proof-accepted state; otherwise, the verifier outputs a proof-rejected state.

Below are described particular embodiments of the invention utilizing particular realizations of the commitment used to generate the message $m_1$.

In certain embodiments of the invention, the message $m_1$ is generated utilizing a homomorphic encryption scheme. In some such embodiments, the commitment $m_1$ comprises the encryptions $E(a)$, $E(b)$, under an additive homomorphic encryption scheme, along with the public key of the encryption scheme. Therefore, in particular such embodiments for which the appropriate line-point evaluation output vector of the underlying LPZK proof system is $\alpha a+b$, from the message $m_2$ generated as a vector v, both the prover and a verifier can compute the ciphertext vector $E(\alpha a+b-v)$ using homomorphic operations. If the prover generates $m_2$ as the correct line-point evaluation output vector v, then this ciphertext vector will be an encryption of the zero vector; otherwise, at least one entry will be nonzero.

The prover generates the message $m_3$ as a zero-knowledge proof that this ciphertext vector is an encryption of the zero vector. In particular such embodiments, the prover may generate such a zero-knowledge proof for each element of the vector. In other particular embodiments, to increase efficiency of storage and communication, the prover and a verifier each compute a query vector $r:=H'(a\|m_2)$, with $r \in \mathbb{E}^n$, using a collision resistant hash function H'. Then both parties compute an encryption $E(r \cdot (\alpha a+b-v))$ using homomorphic operations, and the message $m_3$ is a zero knowledge proof that $E(r \cdot (\alpha a+b-v))$ is an encryption of zero.

In certain embodiments of the invention, for a verifier to verify the correctness of a proof utilizing a homomorphic encryption scheme, the verifier follows the same computations utilizing homomorphic operations as the prover to compute an appropriate ciphertext vector as described above, for example the encryption $E(r \cdot (\alpha a+b-v))$ in specific embodiments described above, and then checks the zero knowledge proof provided in the message $m_3$ that the ciphertext vector is an encryption of a zero value. If this check is successful, the verifier outputs a ciphertext-zero state; otherwise, the verifier outputs a ciphertext-nonzero state. The verifier outputs a commitment-respected state if the verifier outputs a ciphertext-zero state; if the verifier outputs a ciphertext-nonzero state, the verifier outputs a commitment-violated state.

To assist understanding, in the context of particular such embodiments of the invention described above, it is useful to note that if the prover constructs a malicious message $m_2^*$, then at least one term in the vector $(\alpha a+b-m_2^*)$ will be nonzero, and so the value $r \cdot (\alpha a+b-m_2^*)$ will be a nonzero field element with probability $1-1/|\mathbb{E}|$, and so any message $m_3$ will fail to convince the verifier except with soundness error bounded above by $1/|\mathbb{E}|$ plus the soundness error of the homomorphic encryption scheme.

In certain embodiments of the invention, the message $m_1$ is generated utilizing Merkle tree commitments. In some such embodiments, the prover utilizes a linear error correcting code function $\mathcal{C}$ and sets $(c_{a,i})_i := \mathcal{C}(a)$ and $(c_{b,i})_i := \mathcal{C}(b)$, and generates the message $m_1$ as a Merkle tree commitment to pairs of entries from $\mathcal{C}(a)$ and $\mathcal{C}(b)$. In particular such embodiments, the message $m_1$ is a $\text{Com}_{SVC}((c_{a,i}, c_{b,i})_i)$, as shown in FIG. 2, where the $\text{Com}_{SVC}$ functionality is realized as a Merkle tree commitment. In certain embodiments of the invention, the linear error correcting code $\mathcal{C}$ is taken to be a Reed-Solomon code.

In embodiments of the invention utilizing Merkle tree commitments to generate the message $m_1$, the message $m_3$ generated by the prover party comprises a Merkle tree opening to a subset of the committed values of the Merkle tree commitment. In particular such embodiments, after generating the message $m_2$ as described above, the prover generates the message $m_3$ as the Merkle tree opening of a subset of the committed values with indices determined by the output of a collision resistant hash function H" applied to a concatenation of the value $\alpha$, as described above, and the message $m_2$, that is, by $H''(\alpha\|m_2)$.

It will be appreciated from the preceding discussions that embodiments of the invention utilizing Merkle tree commitments as described herein can provide security assuming only the existence of collision-resistant hash functions, thereby providing zero-knowledge proofs of knowledge with post-quantum security.

In certain embodiments of the invention, for a verifier to verify the correctness of a proof utilizing Merkle tree commitments, the verifier computes a codeword $(c_{m,i})_i := \mathcal{C}(m_2)$ utilizing the same linear error correcting code function $\mathcal{C}$ used by the prover to generate the message $m_1$. The verifier then checks whether a polynomial function, determined according to the embodiment of the invention, evaluates to zero when applied to the value $\alpha$, the subset of committed values yielded by the Merkle tree opening of the message $m_3$, and the codeword $\mathcal{C}(m_2)$. For example, in particular embodiments described above in which the line-point evaluation output vector of the message $m_2$ is $\alpha a+b$, the verifier checks that for each of the opened values $(c_{a,i}, c_{b,i})$, the equation $c_{m,i} = c_{a,i}\alpha + c_{b,i}$ is satisfied. The verifier then checks whether the Merkle tree opening of the message $m_3$ is consistent with the Merkle tree commitment of the message $m_1$. If both of these checks are successful, the verifier outputs a commitment-respected state; otherwise, the verifier outputs a commitment-violated state.

3 Network and System Implementations

Some embodiments can further include a method for verifying at a first computing device operating as a verifier party a proof of a statement related to private data, the method comprising:

storing the statement, wherein the validity of the statement is capable of being encoded as satisfiability of an arithmetic circuit over a field;

receiving at the first computing device messages $m_1$, $m_2$, $m_3$ from a second computing device, wherein $m_1$, $m_2$, $m_3$ have been computed at the second computing device by:

a. securely storing the private data, wherein the private data is not provided to the first computing device;

b. storing the statement;

c. computing a first vector A, wherein the first vector comprises uniformly random first elements of the field;

d. computing a second vector B based on the private data, wherein the second vector comprises intermediate circuit-wire values of the arithmetic circuit based on the statement, and wherein the intermediate circuit-wire values are elements of an extension of the field;

e. generating a message $m_1$ representing a commitment to the first vector A and second vector B;

f. computing a value alpha as a result of a collision resistant hash function applied to message $m_1$;

g, wherein the first vector A and second vector B correspond to prover-input vectors of a line-point zero knowledge (LPZK) proof system and the value alpha corresponds to a verifier-input random value of the line-point zero knowledge proof system, wherein the LPZK proof system is configured to generate a line-point evaluation output vector based on vector A, vector B, and alpha, and to output a polynomial-relationship satisfied or unsatisfied state, wherein the state is based on the line-point evaluation output vector;

h. generating a message $m_2$ comprising a third vector, wherein the third vector is the line-point evaluation output vector of the LPZK proof system; and i. generating a message $m_3$ representing a zero knowledge proof of knowledge that the first computing device correctly calculated $m_1$, alpha, and $m_2$, based on the first vector A and the second vector B;

generating the value alpha at the first computing device by applying the collision resistant hash function to the message $m_1$;

computing the polynomial-relationship satisfied or unsatisfied state utilizing the verification function of the LPZK proof system, the value alpha and the message $m_2$;

computing a commitment-respected or commitment-violated state based on the message $m_1$, alpha, $m_2$, $m_3$; and computing a proof-accepted or proof-rejected state based on the polynomial-relationship satisfied or unsatisfied state and the commitment-respected or commitment-violated state;

storing the proof-accepted or proof-rejected state as the verification status of the statement with respect to the private data.

In some further embodiments:

the message $m_1$ comprises a first ciphertext encrypting the first vector A under a homomorphic encryption scheme and a second ciphertext encrypting the second vector B under the homomorphic encryption scheme;

generating the message $m_3$ further comprises:

encrypting the third vector under the homomorphic encryption scheme and performing homomorphic operations on the first and second ciphertexts to produce one or more second elements of the extension of the field; and providing a zero-knowledge proof that each of the one or more second elements of the extension of the field is an encryption of zero under the homomorphic encryption scheme; and computing the commitment-respected or commitment-violated state based on the message $m_1$, alpha, $m_2$, $m_3$ comprises:

performing homomorphic operations on the first and second ciphertexts to produce one or more second elements of the extension of the field; and computing a ciphertext-zero or ciphertext-nonzero state based on the one or more second elements of the extension of the field and $m_3$.

In some further embodiments:

the second computing device computes first and second linear error-correcting codes $C_A$, $C_B$ for the first vector A and the second vector B respectively, wherein:

the message $m_1$ is generated as a Merkle tree commitment to pairs of entries from $C_A$ and $C_B$; and the message $m_3$ comprises a Merkle tree opening to some subset of committed values of the Merkle tree commitment;

thereby generating a zero-knowledge proof of knowledge with post-quantum security; and computing the commitment-respected or commitment-violated state based on the message $m_1$, alpha, $m_2$, and $m_3$ comprises:

computing a third linear error-correcting code $C_V$ for the message $m_2$;

checking whether a polynomial function evaluates to zero on the value alpha, the subset of committed values and the entries of $C_V$; and checking whether the Merkle tree opening $m_3$ is consistent with the Merkle tree commitment $m_1$.

Referring to FIG. 3, a system for generating and verifying zero-knowledge proofs is depicted. The system includes a prover party computing device 105, which may be any type of computing device capable of executing cryptographic operations. In some cases, the prover party computing device 105 may be a standard personal computer, while in other cases, it may be a high-performance server, a cloud-based compute service, a dedicated cryptographic hardware device, a graphical processing unit (GPU), a field-programmable gate array (FPGA), or even a quantum computer. The choice of computing device for the prover party computing device 105 may depend on the specific requirements of the cryptographic protocol being used and the computational demands it imposes.

The prover party computing device 105 contains private data 110, which is securely stored and not provided to at least one of the verifier parties. The private data 110 could be any type of sensitive information that the prover party wishes to keep confidential while proving a statement about it. The prover party computing device 105 also stores a statement 115, which can be encoded as the satisfiability of an arithmetic circuit over a field. The statement 115 represents a claim about the private data 110 that the prover party wishes to prove without revealing the private data itself.

The prover party computing device 105 computes a first vector A and a second vector B based on the private data 110. The first vector A comprises uniformly random first elements of an extension of the field, while the second vector B comprises intermediate circuit-wire values of the arithmetic circuit based on the statement 115. These intermediate circuit-wire values are elements of the field. The prover party computing device 105 then generates a message m1, which represents a commitment to the first vector A and the second vector B.

The prover party computing device 105 also computes a value alpha as a result of a collision-resistant hash function applied to the message m1. The value alpha, the first vector A, and the second vector B are used in a line-point zero-knowledge (LPZK) proof system to generate a line-point evaluation output vector and to determine whether a polynomial relationship is satisfied or unsatisfied. The state of this relationship is based on the line-point evaluation output vector.

Continuing with the description of the system, the prover party computing device 105 generates a message m2, which comprises a third vector. This third vector may be the line-point evaluation output vector of the LPZK proof system. In some cases, the third vector may be computed based on the first vector A, the second vector B, and the value alpha. The prover party computing device 105 also generates a message m3, which represents a zero-knowledge proof of knowledge. This proof of knowledge may confirm that the prover party computing device 105 correctly calculated the messages m1, m2, and the value alpha, based on the first vector A and the second vector B.

In some embodiments, the message m1 may comprise a first ciphertext encrypting the first vector A under a homomorphic encryption scheme and a second ciphertext encrypting the second vector B under the same scheme. The use of a homomorphic encryption scheme allows for computations to be performed on the encrypted data without decrypting it, thereby preserving the privacy of the data. The generation of the message m3 may involve encrypting the third vector under the homomorphic encryption scheme and performing homomorphic operations on the first and second ciphertexts. These operations may produce one or more second elements of the extension of the field. The prover party computing device 105 may then provide a zero-knowledge proof that each of the one or more second elements of the extension of the field is an encryption of zero under the homomorphic encryption scheme.

In some cases, the prover party computing device 105 may compute first and second linear error-correcting codes $C_A$, $C_B$ for the first vector A and the second vector B respectively. These error-correcting codes can help detect and correct errors that may occur during the transmission or storage of the vectors. The message m1 may be generated as a Merkle tree commitment to pairs of entries from CA and CB. A Merkle tree commitment is a cryptographic commitment scheme that allows for efficient and secure verification of the contents of large data structures. The message m3 may comprise a Merkle tree opening to some subset of committed values of the Merkle tree commitment. This allows the verifier party 150 to verify the correctness of the committed values without revealing the full contents of the Merkle tree.

The prover party computing device 105 stores the messages m1, m2, and m3 on a computerized storage device, such that they are electronically accessible to one or more of the verifier parties by a network device. This storage device could be a hard drive, a solid-state drive, a flash memory device, or any other type of device capable of storing digital data. The network device could be a network interface card, a wireless network adapter, or any other type of device capable of transmitting and receiving data over a network. The choice of storage device and network device may depend on the specific requirements of the system, such as the amount of data to be stored, the speed of data transmission, and the security requirements.

The prover party computing device 105 may also be configured to transmit at least one of the messages m1, m2, and m3 to one or more verifier parties, such as verifier party 150, utilizing a communication channel. This communication channel could be part of a network 135, which may be any type of network capable of transmitting data, such as a local area network (LAN), a wide area network (WAN), the Internet, a private network, a blockchain network, a mobile network, a peer-to-peer network (P2P), or a software-defined network (SDN). The choice of network 135 may depend on the specific requirements of the system, such as the speed of data transmission, the security requirements, and the geographical distribution of the verifier parties.

In some cases, the prover party computing device 105 may be configured to publish at least one of the messages m1, m2, and m3 to a server connected to a communication network. This server could be a web server, a file server, a database server, or any other type of server capable of storing and serving data. The communication network could be the same as or different from the network 135 used for transmitting the messages to the verifier parties. The choice of server and communication network may depend on the specific requirements of the system, such as the amount of data to be published, the speed of data access, and the security requirements.

The system may include a computerized processor, such as prover processor device 130, configured for executing at a first computing device operating as a prover party. This processor could be a central processing unit (CPU), a graphical processing unit (GPU), a field-programmable gate array (FPGA), a quantum processor, or any other type of processor capable of executing cryptographic operations. The choice of processor may depend on the specific requirements of the cryptographic protocol being used and the computational demands it imposes.

In some embodiments, the message m1 may comprise a first ciphertext encrypting the first vector A under a homomorphic encryption scheme and a second ciphertext encrypting the second vector B under the same scheme. Homomorphic encryption is a form of encryption that allows computations to be carried out on ciphertext, thus generating an encrypted result which, when decrypted, matches the result of operations performed on the plaintext. This property of homomorphic encryption can be leveraged to perform computations on the first vector A and the second vector B without revealing their contents.

The system may also be configured to compute first and second linear error-correcting codes CA, CB for the first vector A and the second vector B respectively. Linear error-correcting codes are a type of error detection and correction code that can be used to detect and correct errors that may occur during the transmission or storage of data. The use of these codes can enhance the reliability and integrity of the data in the first vector A and the second vector B.

The system may also be configured to transmit at least one of the messages m1, m2, and m3 120 to one or more verifier parties, such as verifier party 150, utilizing a communication channel. This communication channel could be part of a network 135, which may be any type of network capable of transmitting data. In some cases, the network 135 could be a local area network (LAN), a wide area network (WAN), the Internet, a private network, a blockchain network, a mobile network, a peer-to-peer network (P2P), or a software-defined network (SDN). The choice of network 135 may depend on the specific requirements of the system, such as the speed of data transmission, the security requirements, and the geographical distribution of the verifier parties.

In some embodiments, the system may be configured to publish at least one of the messages m1, m2, and m3 120 to a server connected to a communication network. This server could be a web server, a file server, a database server, or any other type of server capable of storing and serving data. The communication network could be the same as or different from the network 135 used for transmitting the messages to the verifier parties.

The choice of server and communication network may depend on the specific requirements of the system, such as the amount of data to be published, the speed of data access, and the security requirements.

The system may include a computerized processor, such as prover processor device 130, configured for executing at a first computing device operating as a prover party. This processor could be a central processing unit (CPU), a graphical processing unit (GPU), a field-programmable gate array (FPGA), a quantum processor, or any other type of processor capable of executing cryptographic operations. The choice of processor may depend on the specific requirements of the cryptographic protocol being used and the computational demands it imposes.

The system may also be configured to securely store the private data 110, which is not provided to at least one of the verifier parties, such as verifier party 150. The private data 110 could be any type of sensitive information that the prover party wishes to keep confidential while proving a statement about it. The system may also store the statement 115, which can be encoded as the satisfiability of an arithmetic circuit over a field. The statement 115 represents a claim about the private data 110 that the prover party wishes to prove without revealing the private data itself.

The instructions executed by the prover party computing device 105 may further involve computing a first vector A and a second vector B based on the private data 110. The first vector A may comprise uniformly random first elements of an extension of the field, while the second vector B may comprise intermediate circuit-wire values of the arithmetic circuit based on the statement 115. These intermediate circuit-wire values are elements of the field. The prover party computing device 105 may then generate a message m1, which represents a commitment to the first vector A and the second vector B. This commitment could be a cryptographic commitment that binds the prover party to a particular value, and hides this value, until the prover party chooses to reveal it.

The instructions may also involve computing a value alpha as a result of a collision-resistant hash function applied to the message m1. The value alpha, the first vector A, and the second vector B may be used in a line-point zero-knowledge (LPZK) proof system to generate a line-point evaluation output vector and to determine whether a polynomial relationship is satisfied or unsatisfied. The state of this relationship is based on the line-point evaluation output vector.

The instructions may further involve generating a message m2, which comprises a third vector. This third vector may be the line-point evaluation output vector of the LPZK proof system. In some cases, the third vector may be computed based on the first vector A, the second vector B, and the value alpha. The prover party computing device 105 may also generate a message m3, which represents a zero-knowledge proof of knowledge. This proof of knowledge may confirm that the prover party computing device 105 correctly calculated the messages m1, m2, and the value alpha, based on the first vector A and the second vector B. This zero-knowledge proof of knowledge allows the prover party to prove that they know a value x, without conveying any information apart from the fact that they know the value x.

In some cases, the instructions executed by the prover party computing device 105 may involve storing the messages m1, m2, and m3 on a computerized storage device. This storage device could be any type of device capable of storing digital data, such as a hard drive, a solid-state drive, a flash memory device, or a cloud storage service. The messages m1, m2, and m3 are stored in such a way that they are electronically accessible to one or more of the verifier parties, such as verifier party 150, by a network device. This network device could be a network interface card, a wireless network adapter, or any other type of device capable of transmitting and receiving data over a network. The choice of storage device and network device may depend on the specific requirements of the system, such as the amount of data to be stored, the speed of data transmission, and the security requirements.

In some embodiments, the message m1 may comprise a first ciphertext and a second ciphertext. The first ciphertext encrypts the first vector A under a homomorphic encryption scheme, and the second ciphertext encrypts the second vector B under the same scheme. Homomorphic encryption is a form of encryption that allows computations to be carried out on ciphertext, thus generating an encrypted result which, when decrypted, matches the result of operations performed on the plaintext. This property of homomorphic encryption can be leveraged to perform computations on the first vector A and the second vector B without revealing their contents.

The instructions executed by the power party computing device 105 may also involve encrypting the third vector under the homomorphic encryption scheme and performing homomorphic operations on the first and second ciphertexts. These operations may produce one or more second elements of the extension of the field. The prover party computing device 105 may then provide a zero-knowledge proof that each of the one or more second elements of the extension of the field is an encryption of zero under the homomorphic encryption scheme. This zero-knowledge proof allows the prover party to prove that they know a value x, without conveying any information apart from the fact that they know the value x.

In some cases, the instructions executed by the prover party computing device 105 may involve computing first and second linear error-correcting codes CA, CB for the first vector A and the second vector B respectively. Linear error-correcting codes are a type of error detection and correction code that can be used to detect and correct errors that may occur during the transmission or storage of data. The use of these codes can enhance the reliability and integrity of the data in the first vector A and the second vector B.

In some embodiments, the message m1, generated by the prover party computing device 105, may be a Merkle tree commitment to pairs of entries from two linear error-correcting codes CA and CB. These codes could be computed for the first vector A and the second vector B respectively. A Merkle tree commitment is a type of cryptographic commitment that allows for efficient and secure verification of the contents of large data structures. It uses a binary tree of hashes and can provide a proof of integrity and commitment to the data. The use of a Merkle tree commitment in the generation of the message m1 can enhance the security and efficiency of the system.

In some cases, the message m3, also generated by the prover party computing device 105, may comprise a Merkle tree opening to some subset of committed values of the Merkle tree commitment. This allows the verifier party 150 to verify the correctness of the committed values without revealing the full contents of the Merkle tree. This feature can be particularly useful in scenarios where the verifier party 150 does not have access to the full data set, but still requires a proof of integrity for a subset of the data.

In some embodiments, the prover party computing device 105 may be configured to transmit at least one of the messages m1, m2, and m3 to one or more verifier parties, such as verifier party 150, utilizing a communication channel. This communication channel could be part of a network 135, which may be any type of network capable of transmitting data. In some cases, the network 135 could be a local area network (LAN), a wide area network (WAN), the Internet, a private network, a blockchain network, a mobile network, a peer-to-peer network (P2P), or a software-defined network (SDN). The choice of network 135 may depend on the specific requirements of the system, such as the speed of data transmission, the security requirements, and the geographical distribution of the verifier parties.

In some cases, the prover party computing device 105 may be configured to publish at least one of the messages m1, m2, and m3 to a server connected to a communication network. This server could be a web server, a file server, a database server, or any other type of server capable of storing and serving data. The communication network could be the same as or different from the network 135 used for transmitting the messages to the verifier parties. The choice of server and communication network may depend on the specific requirements of the system, such as the amount of data to be published, the speed of data access, and the security requirements.

The prover party computing device 105 may be implemented using different types of computing devices. For example, in some cases, the prover party computing device 105 may be a standard personal computer. In other cases, it may be a high-performance server, a cloud-based compute service, a dedicated cryptographic hardware device, a graphical processing unit (GPU), a field-programmable gate array (FPGA), or even a quantum computer. The choice of computing device for the prover party computing device 105 may depend on the specific requirements of the cryptographic protocol being used and the computational demands it imposes.

The verifier party 150 may be implemented using different types of computing devices. For instance, in some cases, the verifier party 150 may be a standard personal computer. In other scenarios, it could be a mobile device, an embedded system, a cloud-based service, a dedicated cryptographic hardware device, or an edge computing device. The choice of computing device for the verifier party 150 may depend on the specific requirements of the cryptographic protocol being used, the computational demands it imposes, and the environment in which the verifier operates.

The private data 110 used in the statement 115 can vary widely depending on the application. For example, the private data 110 could be financial information, such as account balances or transaction details. In other cases, it could be identity attributes, such as age or nationality. The private data 110 could also be cryptographic keys, health records, eligibility and compliance data, voting data, location data, or ownership and rights data. The choice of private data 110 may depend on the sensitivity and type of the data involved, as well as the specific requirements of the application implementing zero-knowledge proofs.

The network 135 used for communication between the prover party computing device 105 and the verifier party 150 can be implemented using different types of network components. These components could include communication protocols, servers, distributed systems, database systems, cloud services, network security appliances, content delivery networks (CDNs), and edge computing devices. The choice of network components for the network 135 may depend on the specific requirements of the system, such as the speed of data transmission, the security requirements, and the scalability of the system.

The network 135 itself could be of various types. For instance, it could be a local area network (LAN), a wide area network (WAN), the Internet, a private network, a blockchain network, a mobile network, a peer-to-peer network (P2P), or a software-defined network (SDN). The choice of network 135 may depend on the specific requirements of the system, such as the speed of data transmission, the security requirements, and the geographical distribution of the prover and verifier parties.

In some cases, the network 135 could be a local network, implemented using different types of local networks. These could include a system bus, shared memory, pipes, message queues, sockets, direct memory access (DMA), and multi-threading and multiprocessing. The choice of local network for the network 135 may depend on the specific requirements of the system, such as the speed of data transmission, the security requirements, and the computational demands of the zero-knowledge proofs.

The prover party computing device 105, as depicted in FIG. 3, may be a computing device that executes a series of operations as part of a method for generating a proof of a statement related to private data 110. The private data 110, which is securely stored within the prover party computing device 105, is not provided to at least one of the verifier parties, such as verifier party 150. This ensures the confidentiality of the private data 110 while allowing the prover party to prove a statement about it.

The prover party computing device 105 also stores a statement 115, which can be encoded as the satisfiability of an arithmetic circuit over a field. The statement 115 represents a claim about the private data 110 that the prover party wishes to prove without revealing the private data itself. The encoding of the statement 115 as the satisfiability of an arithmetic circuit over a field allows for efficient and secure verification of the statement.

The prover party computing device 105 computes a first vector A and a second vector B based on the private data 110. The first vector A comprises uniformly random first elements of an extension of the field, while the second vector B comprises intermediate circuit-wire values of the arithmetic circuit based on the statement 115. These intermediate circuit-wire values are elements of the field. The computation of the first vector A and the second vector B based on the private data 110 allows the prover party to generate a proof of the statement 115 without revealing the private data itself.

The prover party computing device 105 then generates a message m1, which represents a commitment to the first vector A and the second vector B. This commitment binds the prover party to the first vector A and the second vector B, and hides these vectors until the prover party chooses to reveal them. This commitment, represented by the message m1, enhances the security of the proof by preventing the prover party from changing the first vector A and the second vector B after the commitment has been made.

The prover party computing device 105 further computes a value alpha as a result of a collision-resistant hash function applied to the message m1. The value alpha, the first vector A, and the second vector B are used in a line-point zero-knowledge (LPZK) proof system to generate a line-point evaluation output vector and to determine whether a polynomial relationship is satisfied or unsatisfied. The state of this relationship is based on the line-point evaluation output vector.

The prover party computing device 105 generates a message m2, which comprises a third vector. This third vector may be the line-point evaluation output vector of the LPZK proof system. In some cases, the third vector may be computed based on the first vector A, the second vector B, and the value alpha. The prover party computing device 105 also generates a message m3, which represents a zero-knowledge proof of knowledge. This proof of knowledge may confirm that the prover party computing device 105 correctly calculated the messages m1, m2, and the value alpha, based on the first vector A and the second vector B. This zero-knowledge proof of knowledge allows the prover party to prove that they know a value x, without conveying any information apart from the fact that they know the value x.

The prover party computing device 105 stores the messages m1, m2, and m3 on a computerized storage device, such that they are electronically accessible to one or more of the verifier parties by a network device. This storage device could be a hard drive, a solid-state drive, a flash memory device, or any other type of device capable of storing digital data. The network device could be a network interface card, a wireless network adapter, or any other type of device capable of transmitting and receiving data over a network. The choice of storage device and network device may depend on the specific requirements of the system, such as the amount of data to be stored, the speed of data transmission, and the security requirements.

In some embodiments, the message m1 may comprise a first ciphertext encrypting the first vector A under a homomorphic encryption scheme and a second ciphertext encrypting the second vector B under the same scheme. Homomorphic encryption is a form of encryption that allows computations to be carried out on ciphertext, thus generating an encrypted result which, when decrypted, matches the result of operations performed on the plaintext. This property of homomorphic encryption can be leveraged to perform computations on the first vector A and the second vector B without revealing their contents.

The prover party computing device 105 further encrypts the third vector under the homomorphic encryption scheme and performs homomorphic operations on the first and second ciphertexts. These operations may produce one or more second elements of the extension of the field. Homomorphic encryption is a form of encryption that allows computations to be carried out on ciphertext, thus generating an encrypted result which, when decrypted, matches the result of operations performed on the plaintext. This property of homomorphic encryption can be leveraged to perform computations on the third vector without revealing its contents. The prover party computing device 105 may then provide a zero-knowledge proof that each of the one or more second elements of the extension of the field is an encryption of zero under the homomorphic encryption scheme. This zero-knowledge proof allows the prover party to prove that they know a value x, without conveying any information apart from the fact that they know the value x.

In some cases, the prover party computing device 105 may compute first and second linear error-correcting codes $C_A$, $C_B$ for the first vector A and the second vector B respectively. Linear error-correcting codes are a type of error detection and correction code that can be used to detect and correct errors that may occur during the transmission or storage of data. The use of these codes can enhance the reliability and integrity of the data in the first vector A and the second vector B. The computation of these codes may involve applying a linear transformation to the vectors, adding redundancy to the data, and checking for consistency in the transformed data.

The prover party computing device 105 may generate the message m1 as a Merkle tree commitment to pairs of entries from CA and CB. A Merkle tree commitment is a type of cryptographic commitment that allows for efficient and secure verification of the contents of large data structures. It uses a binary tree of hashes and can provide a proof of integrity and commitment to the data. The use of a Merkle tree commitment in the generation of the message m1 can enhance the security and efficiency of the system.

The prover party computing device 105 may also generate a message m3, which comprises a Merkle tree opening to some subset of committed values of the Merkle tree commitment. This allows the verifier party 150 to verify the correctness of the committed values without revealing the full contents of the Merkle tree. This feature can be particularly useful in scenarios where the verifier party 150 does not have access to the full data set, but still requires a proof of integrity for a subset of the data.

In some embodiments, the prover party computing device 105 may generate a zero-knowledge proof of knowledge with post-quantum security. Post-quantum security refers to cryptographic algorithms that are thought to be secure against an attack by a quantum computer. This is not true for some popular public-key algorithms, which can be broken by Shor's algorithm. As large-scale quantum computers do not yet exist, these algorithms are theoretically secure, but it is unknown if they will remain secure in the future. A zero-knowledge proof of knowledge with post-quantum security can provide a higher level of security assurance in the face of potential future advances in quantum computing.

The prover party computing device 105 may be configured to transmit at least one of the messages m1, m2, and m3 120 to one or more verifier parties, such as verifier party 150, utilizing a communication channel. This communication channel could be part of a network 135, which may be any type of network capable of transmitting data. In some cases, the network 135 could be a local area network (LAN), a wide area network (WAN), the Internet, a private network, a blockchain network, a mobile network, a peer-to-peer network (P2P), or a software-defined network (SDN). The choice of network 135 may depend on the specific requirements of the system, such as the speed of data transmission, the security requirements, and the geographical distribution of the verifier parties.

In some cases, the prover party computing device 105 may be configured to publish at least one of the messages m1, m2, and m3 120 to a server connected to a communication network. This server could be a web server, a file server, a database server, or any other type of server capable of storing and serving data. The communication network could be the same as or different from the network 135 used for transmitting the messages to the verifier parties. The choice of server and communication network may depend on the specific requirements of the system, such as the amount of data to be published, the speed of data access, and the security requirements.

The system may include a computerized processor, such as prover processor device 130, configured for executing at a first computing device operating as a prover party. This processor could be a central processing unit (CPU), a graphical processing unit (GPU), a field-programmable gate array (FPGA), a quantum processor, or any other type of processor capable of executing cryptographic operations. The choice of processor may depend on the specific requirements of the cryptographic protocol being used and the computational demands it imposes.

In some embodiments, the message m1 may comprise a first ciphertext encrypting the first vector A under a homomorphic encryption scheme and a second ciphertext encrypting the second vector B under the same scheme. Homomorphic encryption is a form of encryption that allows computations to be carried out on ciphertext, thus generating an encrypted result which, when decrypted, matches the result of operations performed on the plaintext. This property of homomorphic encryption can be leveraged to perform computations on the first vector A and the second vector B without revealing their contents.

The system may also be configured to compute first and second linear error-correcting codes CA, CB for the first vector A and the second vector B respectively. Linear error-correcting codes are a type of error detection and correction code that can be used to detect and correct errors that may occur during the transmission or storage of data. The use of these codes can enhance the reliability and integrity of the data in the first vector A and the second vector B. The computation of these codes may involve applying a linear transformation to the vectors, adding redundancy to the data, and checking for consistency in the transformed data.

The system may further comprise transmitting at least one of the messages m1, m2, and m3 120 to one or more verifier parties, such as verifier party 150, utilizing a communication channel. This communication channel could be part of a network 135, which may be any type of network capable of transmitting data. In some cases, the network 135 could be a local area network (LAN), a wide area network (WAN), the Internet, a private network, a blockchain network, a mobile network, a peer-to-peer network (P2P), or a software-defined network (SDN). The choice of network 135 may depend on the specific requirements of the system, such as the speed of data transmission, the security requirements, and the geographical distribution of the verifier parties.

In some cases, the prover party computing device 105 may be configured to publish at least one of the messages m1, m2, and m3 120 to a server connected to a communication network. This server could be a web server, a file server, a database server, or any other type of server capable of storing and serving data. The communication network could be the same as or different from the network 135 used for transmitting the messages to the verifier parties. The choice of server and communication network may depend on the specific requirements of the system, such as the amount of data to be published, the speed of data access, and the security requirements.

The system may include a computerized processor, such as prover processor device 130, configured for executing at a first computing device operating as a prover party. This processor could be a central processing unit (CPU), a graphical processing unit (GPU), a field-programmable gate array (FPGA), a quantum processor, or any other type of processor capable of executing cryptographic operations. The choice of processor may depend on the specific requirements of the cryptographic protocol being used and the computational demands it imposes.

The system may also be configured to securely store the private data 110, which is not provided to at least one of the verifier parties, such as verifier party 150. The private data 110 could be any type of sensitive information that the prover party wishes to keep confidential while proving a statement about it. The system may also store the statement 115, which can be encoded as the satisfiability of an arithmetic circuit over a field. The statement 115 represents a claim about the private data 110 that the prover party wishes to prove without revealing the private data itself. The encoding of the statement 115 as the satisfiability of an arithmetic circuit over a field allows for efficient and secure verification of the statement.

The instructions executed by the prover party computing device 105 may involve computing a first vector A and a second vector B based on the private data 110. The first vector A may comprise uniformly random first elements of an extension of the field, while the second vector B may comprise intermediate circuit-wire values of the arithmetic circuit based on the statement 115. These intermediate circuit-wire values are elements of the field. The computation of the first vector A and the second vector B based on the private data 110 allows the prover party to generate a proof of the statement 115 without revealing the private data itself.

The prover party computing device 105 then generates a message m1, which represents a commitment to the first vector A and the second vector B. This commitment binds the prover party to the first vector A and the second vector B, and hides these vectors until the prover party chooses to reveal them. This commitment, represented by the message m1, enhances the security of the proof by preventing the prover party from changing the first vector A and the second vector B after the commitment has been made.

The prover party computing device 105 further computes a value alpha as a result of a collision-resistant hash function applied to the message m1. The value alpha, the first vector A, and the second vector B are used in a line-point zero-knowledge (LPZK) proof system to generate a line-point evaluation output vector and to determine whether a polynomial relationship is satisfied or unsatisfied. The state of this relationship is based on the line-point evaluation output vector.

The prover party computing device 105 generates a message m2, which comprises a third vector. This third vector may be the line-point evaluation output vector of the LPZK proof system. In some cases, the third vector may be computed based on the first vector A, the second vector B, and the value alpha. The prover party computing device 105 also generates a message m3, which represents a zero-knowledge proof of knowledge. This proof of knowledge may confirm that the prover party computing device 105 correctly calculated the messages m1, m2, and the value alpha, based on the first vector A and the second vector B. This zero-knowledge proof of knowledge allows the prover party to prove that they know a value x, without conveying any information apart from the fact that they know the value x.

The instructions executed by the prover party computing device 105 may involve storing the messages m1, m2, and m3 on a computerized storage device. This storage device could be any type of device capable of storing digital data, such as a hard drive, a solid-state drive, a flash memory device, or a cloud storage service. The messages m1, m2, and m3 are stored in such a way that they are electronically accessible to one or more of the verifier parties, such as verifier party 150, by a network device. This network device could be a network interface card, a wireless network adapter, or any other type of device capable of transmitting and receiving data over a network. The choice of storage device and network device may depend on the specific requirements of the system, such as the amount of data to be stored, the speed of data transmission, and the security requirements.

In some embodiments, the message m1 may comprise a first ciphertext and a second ciphertext. The first ciphertext encrypts the first vector A under a homomorphic encryption scheme, and the second ciphertext encrypts the second vector B under the same scheme. Homomorphic encryption is a form of encryption that allows computations to be carried out on ciphertext, thus generating an encrypted result which, when decrypted, matches the result of operations performed on the plaintext. This property of homomorphic encryption can be leveraged to perform computations on the first vector A and the second vector B without revealing their contents.

In some cases, the prover party computing device 105 may be configured to publish encrypting the third vector under the homomorphic encryption scheme and performing homomorphic operations on the first and second ciphertexts. These operations may produce one or more second elements of the extension of the field. Homomorphic encryption is a form of encryption that allows computations to be carried out on ciphertext, thus generating an encrypted result which, when decrypted, matches the result of operations performed on the plaintext. This property of homomorphic encryption can be leveraged to perform computations on the third vector without revealing its contents. The prover party computing device 105 may then provide a zero-knowledge proof that each of the one or more second elements of the extension of the field is an encryption of zero under the homomorphic encryption scheme. This zero-knowledge proof allows the prover party to prove that they know a value x, without conveying any information apart from the fact that they know the value x.

In some cases, the instructions executed by the prover party computing device 105 may involve computing first and second linear error-correcting codes CA, CB for the first vector A and the second vector B respectively. Linear error-correcting codes are a type of error detection and correction code that can be used to detect and correct errors that may occur during the transmission or storage of data. The use of these codes can enhance the reliability and integrity of the data in the first vector A and the second vector B. The computation of these codes may involve applying a linear transformation to the vectors, adding redundancy to the data, and checking for consistency in the transformed data.

The prover party computing device 105 may be configured to transmit at least one of the messages m1, m2, and m3 to one or more verifier parties, such as verifier party 150, utilizing a communication channel. This communication channel could be part of a network 135, which may be any type of network capable of transmitting data. In some cases, the network 135 could be a local area network (LAN), a wide area network (WAN), the Internet, a private network, a blockchain network, a mobile network, a peer-to-peer network (P2P), or a software-defined network (SDN). The choice of network 135 may depend on the specific requirements of the system, such as the speed of data transmission, the security requirements, and the geographical distribution of the verifier parties.

In some embodiments, the prover party computing device 105 may be configured to publish at least one of the messages m1, m2, and m3 to a server connected to a communication network. This server could be a web server, a file server, a database server, or any other type of server capable of storing and serving data. The communication network could be the same as or different from the network 135 used for transmitting the messages to the verifier parties. The choice of server and communication network may depend on the specific requirements of the system, such as the amount of data to be published, the speed of data access, and the security requirements.

The prover party computing device 105 can be implemented using a variety of computing devices. For instance, in some cases, the prover party computing device 105 may be a standard personal computer. This type of device can run general-purpose programming languages and frameworks that support cryptographic operations, making it suitable for many cryptographic applications, especially those that are less computationally intensive or optimized for efficiency. In other cases, the prover party computing device 105 may be a high-performance server. These servers, equipped with powerful CPUs and large amounts of RAM, can handle larger datasets and more complex calculations more efficiently than standard PCs. They are particularly useful when the zero-knowledge proofs involve extensive computations or when serving multiple requests at scale.

In some scenarios, the prover party computing device 105 could be a cloud-based compute service, such as those offered by platforms like AWS, Azure, or Google Cloud. These platforms provide scalable compute resources that can be adjusted according to demand, making them beneficial for deploying zero-knowledge proofs that scale based on user demand or computational intensity. Cloud services also offer specialized computing resources like GPU and FPGA instances, which can be leveraged for particular types of cryptographic computations.

In high-security environments, the prover party computing device 105 might be a dedicated cryptographic hardware device, such as a Hardware Security Module (HSM) or a secure cryptoprocessor. These devices are designed to perform cryptographic operations securely and efficiently, offering physical and logical protection against tampering and extraction of sensitive data. For zero-knowledge proofs that involve parallelizable computations, the prover party computing device 105 could be a Graphical Processing Unit (GPU). The parallel processing capabilities of GPUs make them suitable for tasks such as matrix operations and large-scale arithmetic computations that are common in some types of zero-knowledge proofs.

In some cases, the prover party computing device 105 could be a Field-Programmable Gate Array (FPGA). FPGAs can be programmed to perform specific cryptographic operations at the hardware level, offering a balance between general-purpose processing and fixed-function cryptographic hardware. They are particularly useful for custom or experimental cryptographic protocols that benefit from hardware-level optimization. While still largely in the experimental phase, quantum computers represent a future possibility for the prover party computing device 105. Quantum-resistant cryptographic protocols, including some zero-knowledge proofs, are an area of active research, anticipating the advent of practical quantum computing.

The verifier party 150 can also be implemented using a variety of computing devices. For many applications involving zero-knowledge proofs, a standard personal computer may be perfectly adequate to act as the verifier party 150. These devices can handle the computational tasks involved in verifying proofs, which are generally less intense than generating the proofs. This makes personal computers a common choice for roles that require verifying credentials, transactions, or other data.

In many practical applications, especially in consumer-facing technologies like digital wallets, mobile apps, and secure communications, the verifier party 150 may operate on mobile devices such as smartphones and tablets. These devices are capable of performing the cryptographic operations to verify proofs, offering both convenience and portability. In applications where zero-knowledge proofs are used in IoT (Internet of Things) devices or other embedded systems, the verifier party 150 might be implemented on small, resource-constrained devices. These systems are designed to efficiently verify proofs with minimum power consumption and processing power, suitable for applications like access control systems and secure sensor networks.

For services that require scalability and the ability to handle high volumes of verification requests, the verifier party 150 could use cloud-based compute services. These platforms can dynamically allocate resources to handle peaks in verification requests efficiently. Additionally, cloud services can provide robust security measures to protect the verification process. While generally more relevant for the prover, dedicated cryptographic hardware like Hardware Security Modules (HSMs) can also be used by the verifier party 150 in high-security environments. These devices ensure that cryptographic operations are performed in a secure, tamper-resistant environment, which is paramount in scenarios where security is of utmost concern.

In decentralized applications, such as those based on blockchain technology, verifications may be performed at the edge of the network by the verifier party 150. Edge computing devices, which process data near the source of data generation, are well-suited for such tasks. They help reduce latency, conserve bandwidth, and enhance privacy, which are valuable for distributed applications requiring frequent verifications.

The private data 110 that could be the subject of the statement 115 varies widely, depending on the application. Zero-knowledge proofs (ZKPs) allow one party, the prover, to prove to another party, the verifier, that a statement about hidden data is true, without revealing the data itself. This capability is extremely useful in numerous scenarios where privacy and security are paramount. Here are several types of private data that are commonly used as the subject of statements in zero-knowledge proofs:

Financial Information: ZKPs can be used to prove statements related to financial transactions without revealing the exact details of those transactions. For example, a prover can demonstrate that they have sufficient balance to make a payment without disclosing the actual account balance.

Identity Attributes: In identity verification systems, ZKPs can enable individuals to prove they possess specific credentials (like age or nationality) without revealing any other personal information. For instance, proving one is over a specific age to access age-restricted services without showing the actual date of birth.

Cryptographic Keys: In cryptographic protocols, a party can prove possession of a cryptographic key without revealing the actual cryptographic keys. This application is paramount in systems where ownership or rights have to be confirmed without compromising the security of the keys.

Health Records: ZKPs can be used in healthcare to allow entities to verify specific attributes of a patient's health record (like a medical condition or a prescription) without accessing the complete document. This is particularly relevant for maintaining patient confidentiality.

Eligibility and Compliance: In regulatory compliance, a company or individual could use ZKPs to prove compliance with specific requirements without exposing the underlying data that substantiates that compliance. For example, demonstrating that waste disposal meets environmental standards without revealing detailed operational data.

Voting: In electronic voting systems, ZKPs can be used to prove that a vote was cast correctly according to the voting rules, without revealing the vote itself. This application is paramount for maintaining the secrecy and integrity of the ballot.

Location Data: Zero-knowledge proofs can be used to show that an individual or asset is within a specific geographical boundary without revealing their exact location. This can be useful in scenarios like geofencing or in proving eligibility for location-specific services.

Ownership and Rights: ZKPs are useful in proving ownership of digital assets (like NFTs or other digital rights) without revealing other attributes of the owner or the asset. This can be paramount in blockchain applications where anonymity and privacy are valued.

The network 135 used for communication between the prover party computing device 105 and the verifier party 150 can be implemented using different types of network components. These components could include communication protocols, servers, distributed systems, database systems, cloud services, network security appliances, content delivery networks (CDNs), and edge computing devices. The choice of network components for the network 135 may depend on the specific requirements of the system, such as the speed of data transmission, the security requirements, and the scalability of the system.

The network 135, which facilitates communication between the prover party computing device 105 and the verifier party 150, can be implemented using various types of networks. For instance, in some cases, the network 135 could be a local area network (LAN). A LAN connects network devices over a relatively short distance, such as within a building or a campus. This setup can be ideal for zero-knowledge proofs conducted within a single organization where both the prover and verifier are on the same secure network. LANs typically offer high data transfer speeds and low latency, which are advantageous for the rapid communication of zero-knowledge proofs.

In other cases, the network 135 could be a wide area network (WAN). A WAN covers a broader geographic area than a LAN, potentially encompassing connections between cities or countries. WANs can be used to facilitate zero-knowledge proof communication between distant parties, making them useful for applications like international financial transactions, where the parties involved are not in the same physical location.

In some scenarios, the network 135 could be the Internet, the broadest network, allowing provers and verifiers from anywhere in the world to communicate. The Internet provides flexibility and global reach but introduces challenges such as potentially higher latency and less control over security compared to LANs or WANs. Utilizing secure communication protocols and encryption is paramount when zero-knowledge proofs are executed over the Internet.

In some embodiments, the network 135 could be a private network. These are restricted networks that use leased lines or tunnels over the Internet (such as Virtual Private Networks, VPNs) to enhance security. Private networks are suitable for zero-knowledge proofs that involve sensitive information since they can provide controlled access and improved security measures compared to public networks.

In the context of decentralized applications, such as those built on blockchain technology, the network 135 could be a blockchain network. Blockchain networks offer a distinctive platform where zero-knowledge proofs can be used to verify transactions without revealing underlying data. These networks can maintain data integrity and transparency while ensuring privacy through zero-knowledge techniques.

With the increasing use of mobile devices, mobile networks (such as those based on the 4G LTE and 5G standards) can also be utilized for zero-knowledge proofs, particularly in applications that require mobility or are consumer-oriented. These networks can support secure mobile communications for zero-knowledge proofs, leveraging technologies such as mobile VPNs and end-to-end encryption.

In a peer-to-peer network (P2P), each node in the network acts both as a client and a server. This type of network can be particularly beneficial for zero-knowledge proofs by distributing the computational and storage demands among multiple peers, which can enhance scalability and resilience.

Software-Defined Networks (SDNs) provide an advanced network framework that allows networks to be centrally managed through software-based controllers, which can dynamically adjust network resources and policies based on current demands. This flexibility can be advantageous for managing the network paths, security, and performance characteristics that are requisite for effective and secure communication of zero-knowledge proofs.

In some cases, the network 135 could be a local network, implemented using different types of local networks. These could include a system bus, shared memory, pipes, message queues, sockets, direct memory access (DMA), and multi-threading and multiprocessing. The choice of local network for the network 135 may depend on the specific requirements of the system, such as the speed of data transmission, the security requirements, and the computational demands of the zero-knowledge proofs.

For instance, the system bus, which connects the main components of a computer (CPU, memory, and I/O devices), can be utilized for communication between the prover and verifier. Since both components reside in the same system, data can be exchanged rapidly through the system's internal bus, minimizing latency and maximizing throughput.

In a shared memory configuration, the prover and verifier can communicate through a shared memory space within the same device. This method involves allocating a section of RAM that both processes can access. Shared memory is particularly efficient for inter-process communication (IPC) because it avoids the overhead of context switching and data copying that is typical in other IPC mechanisms.

Named pipes or anonymous pipes can be used for IPC on the same device. Pipes allow sequential data flows and are suitable for cases where the communication pattern between the prover and verifier is relatively simple and can be structured as a stream.

For more complex interactions where messages might have to be prioritized or managed asynchronously, message queues can be used. This method allows messages to be stored in a queue and processed in an orderly manner. Message queues support flexible communication patterns and can handle varying loads effectively.

Even within the same device, socket programming can be utilized, specifically using the loopback network interface (e.g., 127.0.0.1 on IPv4). This approach emulates network interactions and can be useful for testing and development purposes where the software components might eventually be deployed on separate devices but are debugged and validated on a single machine first.

For high-performance requirements, direct memory access (DMA) techniques can be used where the data transfer between the prover and verifier does not load the CPU. This is especially effective for large data transfers, reducing the CPU load and speeding up the communication process.

By utilizing multithreading or multiprocessing within the same application, the prover and verifier can operate as separate threads or processes that communicate through any of the above mechanisms. This approach leverages the device's computing resources effectively and can mimic distributed systems while being confined to a single physical system.

Throughout this disclosure, various terms and phrases are used to describe features of the disclosed technology. It is to be understood that these terms and phrases may encompass a variety of meanings and definitions, as is common in the field of technology and patent law. The definitions of these terms may vary depending on the context in which they are used, the specific embodiment being described, or the interpretation of the technology by those skilled in the art.

For instance, terms such as "computing device," "processor," "memory," and "network" may refer to a wide range of devices, components, systems, and configurations known in the art, and their specific definitions may differ based on the implementation or design of the system. Similarly, phrases like "securely storing," "computing a vector," and "generating a message" may involve various methods, techniques, and processes that achieve the same or similar outcomes but may be executed in different manners.

It is also to be understood that the use of terms in the singular or plural form is not intended to limit the scope of the claims. For example, the mention of "a computing device" does not preclude the presence of multiple computing devices within a system. Likewise, references to "a network" may include various interconnected networks or a single network comprising multiple segments or layers.

Furthermore, the use of the term "may" in relation to an action or feature indicates that the action or feature is possible, but not necessarily mandatory. This term is used to describe optional or alternative aspects of the disclosed technology that provide flexibility in how the technology may be implemented or utilized.

The definitions provided herein are intended to serve as examples and are not exhaustive. Those skilled in the art may ascribe different meanings to these terms based on the context, the specific technology being described, or the advancements in the field. Therefore, the definitions of the terms and phrases used in this disclosure and the claims are to be interpreted broadly and in a manner consistent with the understanding of those skilled in the relevant art.

The use of the word "a" or "an" when used in conjunction with the claims herein is to be interpreted as including one or more than one of the element it introduces. Similarly, the use of the term "or" is intended to be inclusive, such that the phrase "A or B" is intended to include A, B, or both A and B, unless explicitly stated otherwise.

The term "comprising" is to be interpreted as inclusive or open-ended and does not exclude additional, unrecited elements or method steps. However, the term "consisting of" excludes any element, step, or ingredient not specified in the claim. The term "consisting essentially of" limits the scope of a claim to the specified materials or steps and those that do not materially affect the basic and novel characteristic(s) of the claimed disclosure.

Reference throughout the specification to "one embodiment," "another embodiment," "an embodiment," and so forth, means that a particular feature, structure, or characteristic described in connection with the embodiment is included in at least one embodiment of the present disclosure, and may not necessarily be present in all embodiments. Furthermore, the particular features, structures, or characteristics may be combined in any suitable manner in one or more embodiments without limitation.

The use of the terms "first," "second," and the like does not imply any order or sequence, but are used to distinguish one element from another, and the terms "top," "bottom," "front," "back," "leading," "trailing," and the like are used for descriptive purposes and are not necessarily to be construed as limiting.

The terms "connected," "coupled," or any variant thereof, mean any direct or indirect connection or coupling between two or more elements, and may encompass the presence of one or more intermediate elements between the two elements that are connected or coupled to each other.

The description of the embodiments of the present disclosure is intended to be illustrative, and not to limit the scope of the claims. Many alternatives, modifications, and variations will be apparent to those skilled in the art.

The invention claimed is:

1. A method for generating a proof of a statement related to private data while maintaining security among mutually untrusting parties, the method comprising:
   executing at a first computing device operating as a prover party:
   securely storing the private data, wherein the private data is not provided to at least one of the verifier parties;
   storing the statement, wherein the validity of the statement is capable of being encoded as satisfiability of an arithmetic circuit over a field;
   computing a first vector A, wherein the first vector A comprises uniformly random first elements of an extension of the field;
   computing a second vector B based on the private data, wherein the second vector B comprises intermediate circuit-wire values of the arithmetic circuit based on the statement, and wherein the intermediate circuit-wire values are elements of the field;
   generating a message $m_1$ representing a commitment to the first vector A and the second vector B;
   computing a value alpha as a result of a collision resistant hash function applied to the message $m_1$;
   wherein the first vector A and second vector B correspond to prover-input vectors of a line-point zero knowledge (LPZK) proof system and the value alpha corresponds to a verifier-input random value of the LPZK proof system, wherein the LPZK proof system is configured to generate a line-point evaluation output vector based on the first vector A, the second vector B, and the value alpha, and to output a polynomial-relationship satisfied or unsatisfied state, wherein the state is based on the line-point evaluation output vector;
   generating a message $m_2$ comprising a third vector, wherein the third vector is the line-point evaluation output vector of the LPZK proof system;
   generating a message $m_3$ representing a zero knowledge proof of knowledge that the first computing device correctly calculated the message $m_1$, the value alpha, and the message $m_2$, based on the first vector A and the second vector B; and
   storing the messages $m_1$, $m_2$, and $m_3$ on a computerized storage device, such that they are electronically accessible to one or more of the verifier parties by a network device, as a proof that the statement is valid.

2. The method of claim 1, wherein:
   the message $m_1$ comprises a first ciphertext encrypting the first vector A under a homomorphic encryption scheme and a second ciphertext encrypting the second vector B under the homomorphic encryption scheme; and generating the message $m_3$ further comprises:
   encrypting the third vector under the homomorphic encryption scheme and performing homomorphic operations on the first and second ciphertexts to produce one or more second elements of the extension of the field; and
   providing a zero-knowledge proof that each of the one or more second elements of the extension of the field is an encryption of zero under the homomorphic encryption scheme.

3. The method of claim 1, further comprising computing first and second linear error-correcting codes $C_A$, $C_B$ for the first vector A and the second vector B respectively, wherein:
   the message $m_1$ is generated as a Merkle tree commitment to pairs of entries from $C_A$ and $C_B$;
   the message $m_3$ comprises a Merkle tree opening to some subset of committed values of the Merkle tree commitment; and
   thereby generating a zero-knowledge proof of knowledge with post-quantum security.

4. The method of claim 1, further comprising transmitting at least one of the messages $m_1$, $m_2$, and my to the one or more verifier parties utilizing a communication channel.

5. The method of claim 1, further comprising publishing at least one of the messages $m_1$, $m_2$, and $m_3$ to a server connected to a communication network.

6. A system for generating a proof of a statement related to private data while maintaining security among mutually untrusting parties, the system comprising a computerized processor configured for:
   executing at a first computing device operating as a prover party:
   securely storing the private data, wherein the private data is not provided to at least one of the verifier parties;
   storing the statement, wherein the validity of the statement is capable of being encoded as satisfiability of an arithmetic circuit over a field;
   computing a first vector A, wherein the first vector A comprises uniformly random first elements of an extension of the field;
   computing a second vector B based on the private data, wherein the second vector B comprises intermediate circuit-wire values of the arithmetic circuit based on the statement, and wherein the intermediate circuit-wire values are elements of the field;
   generating a message $m_1$ representing a commitment to the first vector A and the second vector B;
   computing a value alpha as a result of a collision resistant hash function applied to the message $m_1$;
   wherein the first vector A and second vector B correspond to prover-input vectors of a line-point zero knowledge (LPZK) proof system and the value alpha corresponds to a verifier-input random value of the LPZK proof system, wherein the LPZK proof system is configured to generate a line-point evaluation output vector based on the first vector A, the second vector B, and the value alpha, and to output a polynomial-relationship satisfied or unsatisfied state, wherein the state is based on the line-point evaluation output vector;
   generating a message $m_2$ comprising a third vector, wherein the third vector is the line-point evaluation output vector of the LPZK proof system;
   generating a message $m_3$ representing a zero knowledge proof of knowledge that the first computing device correctly calculated the message $m_1$, the value alpha, and the message $m_2$, based on the first vector A and the second vector B; and
   storing the messages $m_1$, $m_2$, and $m_3$ on a computerized storage device, such that they are electronically accessible to one or more of the verifier parties by a network device, as a proof that the statement is valid.

7. The system of claim 6, wherein:
   the message $m_1$ comprises a first ciphertext encrypting the first vector A under a homomorphic encryption scheme and a second ciphertext encrypting the second vector B under the homomorphic encryption scheme; and generating the message $m_3$ further comprises:

encrypting the third vector under the homomorphic encryption scheme and performing homomorphic operations on the first and second ciphertexts to produce one or more second elements of the extension of the field; and providing a zero-knowledge proof that each of the one or more second elements of the extension of the field is an encryption of zero under the homomorphic encryption scheme.

8. The system of claim 6, further comprising computing first and second linear error-correcting codes $C_A$, $C_B$ for the first vector A and the second vector B respectively, wherein:

the message $m_1$ is generated as a Merkle tree commitment to pairs of entries from $C_A$ and $C_B$;

the message $m_3$ comprises a Merkle tree opening to some subset of committed values of the Merkle tree commitment; and thereby generating a zero-knowledge proof of knowledge with post-quantum security.

9. The system of claim 6, further comprising transmitting at least one of the messages $m_1$, $m_2$, and $m_3$ to the one or more verifier parties utilizing a communication channel.

10. The system of claim 6, further comprising publishing at least one of the messages $m_1$, $m_2$, and $m_3$ to a server connected to a communication network.

11. A non-transitory computer-readable media comprising executable instructions configured for generating a proof of a statement related to private data while maintaining security among mutually untrusting parties, the media comprising instructions for:

executing at a first computing device operating as a prover party:

securely storing the private data, wherein the private data is not provided to at least one of the verifier parties;

storing the statement, wherein the validity of the statement is capable of being encoded as satisfiability of an arithmetic circuit over a field;

computing a first vector A, wherein the first vector A comprises uniformly random first elements of an extension of the field;

computing a second vector B based on the private data, wherein the second vector B comprises intermediate circuit-wire values of the arithmetic circuit based on the statement, and wherein the intermediate circuit-wire values are elements of the field;

generating a message $m_1$ representing a commitment to the first vector A and the second vector B;

computing a value alpha as a result of a collision resistant hash function applied to the message $m_1$;

wherein the first vector A and second vector B correspond to prover-input vectors of a line-point zero knowledge (LPZK) proof system and the value alpha corresponds to a verifier-input random value of the LPZK proof system, wherein the LPZK proof system is configured to generate a line-point evaluation output vector based on the first vector A, the second vector B, and the value alpha, and to output a polynomial-relationship satisfied or unsatisfied state, wherein the state is based on the line-point evaluation output vector;

generating a message $m_2$ comprising a third vector, wherein the third vector is the line-point evaluation output vector of the LPZK proof system;

generating a message $m_3$ representing a zero knowledge proof of knowledge that the first computing device correctly calculated the message $m_1$, the value alpha, and the message $m_2$, based on the first vector A and the second vector B; and storing the messages $m_1$, $m_2$, and $m_3$ on a computerized storage device, such that they are electronically accessible to one or more of the verifier parties by a network device, as a proof that the statement is valid.

12. The media of claim 11, wherein:

the message $m_1$ comprises a first ciphertext encrypting the first vector A under a homomorphic encryption scheme and a second ciphertext encrypting the second vector B under the homomorphic encryption scheme; and generating the message $m_3$ further comprises:

encrypting the third vector under the homomorphic encryption scheme and performing homomorphic operations on the first and second ciphertexts to produce one or more second elements of the extension of the field; and providing a zero-knowledge proof that each of the one or more second elements of the extension of the field is an encryption of zero under the homomorphic encryption scheme.

13. The media of claim 11, further comprising computing first and second linear error-correcting codes $C_A$, $C_B$ for the first vector A and the second vector B respectively, wherein:

the message $m_1$ is generated as a Merkle tree commitment to pairs of entries from $C_A$ and $C_B$;

the message $m_3$ comprises a Merkle tree opening to some subset of committed values of the Merkle tree commitment; and thereby generating a zero-knowledge proof of knowledge with post-quantum security.

14. The media of claim 11, further comprising transmitting at least one of the messages $m_1$, $m_2$, and $m_3$ to the one or more verifier parties utilizing a communication channel.

15. The media of claim 11, further comprising publishing at least one of the messages $m_1$, $m_2$, and $m_3$ to a server connected to a communication network.

* * * * *